(12) United States Patent
Yarlagadda et al.

(10) Patent No.: US 12,001,391 B2
(45) Date of Patent: Jun. 4, 2024

(54) MANAGING OBJECTS STORED AT A REMOTE STORAGE

(71) Applicant: Cohesity, Inc., San Jose, CA (US)

(72) Inventors: Praveen Kumar Yarlagadda, Santa Clara, CA (US); Aiswarya Bhavani Shankar, San Jose, CA (US); Venkata Ranga Radhanikanth Guturi, San Jose, CA (US); Anubhav Gupta, Sunnyvale, CA (US)

(73) Assignee: Cohesity, Inc., San Jose, CA (US)

( * ) Notice: Subject to any disclaimer, the term of this patent is extended or adjusted under 35 U.S.C. 154(b) by 69 days.

(21) Appl. No.: 17/476,876

(22) Filed: Sep. 16, 2021

(65) Prior Publication Data

US 2023/0077938 A1    Mar. 16, 2023

(51) Int. Cl.
*G06F 16/10* (2019.01)
*G06F 11/14* (2006.01)
*G06F 16/11* (2019.01)
*G06F 16/174* (2019.01)

(52) U.S. Cl.
CPC ........ *G06F 16/125* (2019.01); *G06F 11/1451* (2013.01); *G06F 16/1752* (2019.01)

(58) Field of Classification Search
None
See application file for complete search history.

(56) References Cited

U.S. PATENT DOCUMENTS

| | | | |
|---|---|---|---|
| 7,293,027 B2 | 11/2007 | Margolus | |
| 7,590,807 B2 | 9/2009 | McGovern | |
| 9,166,989 B2 * | 10/2015 | Huang | G06F 21/552 |
| 9,323,760 B1 | 4/2016 | Chopra | |
| 10,140,303 B1 | 11/2018 | Patterson | |
| 10,528,521 B2 | 1/2020 | Agarwal | |
| 11,086,545 B1 * | 8/2021 | Dayal | G06F 3/067 |
| 11,748,299 B2 | 9/2023 | Yarlagadda et al. | |
| 2005/0055519 A1 | 3/2005 | Stuart | |
| 2005/0138640 A1 | 6/2005 | Fresko | |
| 2008/0263108 A1 | 10/2008 | Herbst | |
| 2010/0036872 A1 | 2/2010 | Hiraiwa | |

(Continued)

OTHER PUBLICATIONS

Bill Tolson, Cloud Archiving and Immutability; Azure offers WORM, Archive360.com, Sep. 20, 2018, https://www.archive360.com/blog/cloud-archiving-and-immutability-azu.

(Continued)

*Primary Examiner* — Belix M Ortiz Ditren
(74) *Attorney, Agent, or Firm* — Shumaker & Sieffert, P.A.

(57) ABSTRACT

An indication to store to a remote storage a new archive of a snapshot of a source storage is received. At least one shared data chunk of the new archive is determined to be already stored in an existing chunk object of the remote storage storing data chunks of a previous archive. One or more evaluation metrics for the existing chunk object are determined based at least in part on a retention period associated with one or more individual chunks stored in the chunk object and a data lock period associated with the entire existing chunk object. It is determined based on the one or more evaluation metrics whether to reference the at least one shared data chunk of the new archive from the existing chunk object or store the at least one shared data chunk in a new chunk object of the remote storage.

20 Claims, 23 Drawing Sheets

(56) References Cited

U.S. PATENT DOCUMENTS

| | | |
|---|---|---|
| 2012/0117029 A1 | 5/2012 | Gold |
| 2020/0250083 A1 | 8/2020 | Shilane |
| 2020/0410135 A1 | 12/2020 | Macey |
| 2021/0042263 A1 | 2/2021 | Zdornov |
| 2021/0124648 A1 | 4/2021 | Srinivasan |
| 2021/0141698 A1 | 5/2021 | Bourgeois |
| 2021/0294774 A1 | 9/2021 | Keller |
| 2022/0083514 A1 | 3/2022 | Rath |
| 2022/0100652 A1 | 3/2022 | Liu |
| 2022/0413968 A1* | 12/2022 | Yeger ............... G06F 11/1461 |
| 2023/0359586 A1 | 11/2023 | Yarlagadda et al. |

OTHER PUBLICATIONS

Ju-Lien Lim, Protecting Backup Archives with WORM and Tape Retention Lock, AWS Storage Blog, Aug. 19, 2020, https://aws.amazon.com/blogs/storage/protecting-archives-with-worm-an/.

Author Unknown, *Architecture Matters Cohesity* vs *Dell EMC PowerScale (previously Dell EMC Isilon) NAS Scale-Out Limits*, Cohesity, Sep. 2021, pp. 1-11, Retrieved from the Internet on Aug. 4, 2023 from URL: https://www.cohesity.com/resource-assets/white-paper/architecture-matters.pdf.

Author Unknown, Cohesity Platform for Data Protection of VMware Cloud on AWS (80830), VMware, Sep. 18, 2020, pp. 1-10, Retrieved from the Internet on Oct. 10, 2023 from URL: https://kb.vmware.com/s/article/80830#.

Author Unknown, Cohesity SpanFS and SnapTree, Sep. 2019, pp. 1-11, Retrieved from the Internet on Aug. 4, 2023 from URL: https://www.cohesity.com/resource-assets/white-paper/Cohesity-SpanFS-and-SnapTree-WP.pdf.

Prosecution History from U.S. Appl. No. 17/476,873, now issued U.S. Pat. No. 11,748,299, dated Sep. 16, 2021 through Aug. 2, 2023, 138 pp.

\* cited by examiner

MANAGING OBJECTS STORED AT A REMOTE STORAGE

BACKGROUND OF THE INVENTION

Data associated with a source system (e.g., metadata, data content) may be archived to a cloud storage associated with a cloud storage provider. The cloud storage provider may provide different performance storage classes. The amount of time to restore or access archived data from the cloud storage depends on a performance storage class storing the archived data. A user associated with the source system may have access (e.g., read or write) to the archived data that is stored in a cloud storage. The user associated with the source system may manually manage the archived data that is stored in the cloud storage, but accidentally delete some of the data due to a malicious attack (e.g., virus, ransomware) or human error. The user's credentials may be compromised and as a result, the archived data that is stored in the cloud may be subject to ransomware.

BRIEF DESCRIPTION OF THE DRAWINGS

Various embodiments of the invention are disclosed in the following detailed description and the accompanying drawings.

DETAILED DESCRIPTION

Figure 1A:
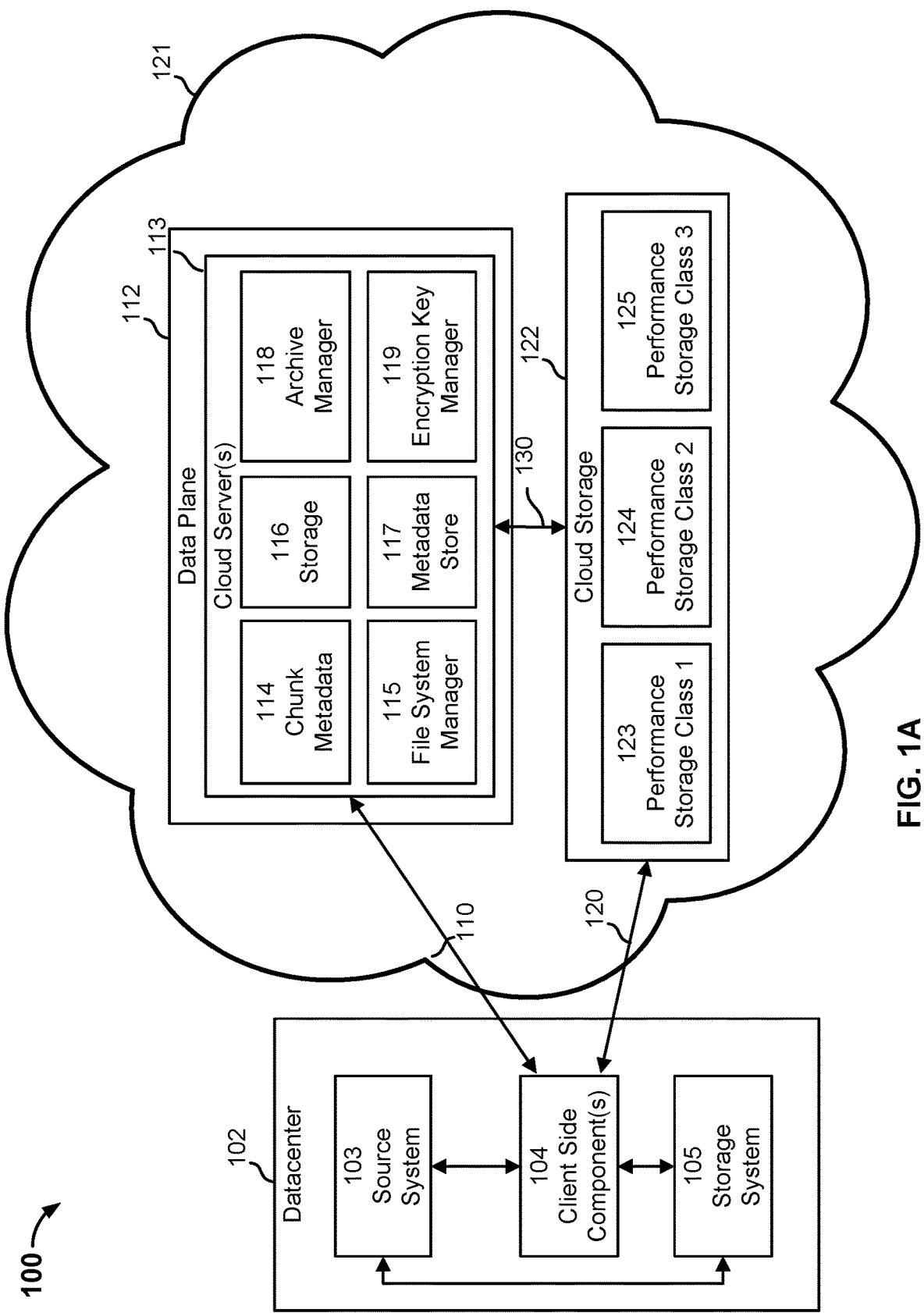
FIG. 1A is a block diagram illustrating a system for managing objects stored in a remote storage in accordance with some embodiments.

Data associated with a source system is archived to a remote storage. An initial archive of the source system corresponds to a state of the source system at a first particular point in time. One or more subsequent incremental archives of the source system may correspond to states of the source system at different points in time. Some of the data that was stored on the source system at the first particular point in time may also be stored on the source system at the different points in time. A subsequent incremental archive includes data that was not previously archived to the remote storage. Data included in a subsequent incremental archive may be deduplicated against data included in one or more previous archives to reduce the amount of storage used by an entity associated with the source system.

The initial archive and the one or more subsequent incremental archives of the source system are associated with corresponding expiration dates. An expiration date associated with an archive may be based on a retention period associated with an archive, or based on the retention period associated with the archive and a data lock period associated with the archive. When an expiration date for an archive expires, the data associated with the archive is to be removed from the remote storage. Object(s) associated with the one or more subsequent incremental archives may reference data chunks included in an object associated with an expired archive. However, removing these data chunks may cause data corruption issues for the one or more subsequent incremental archives because the object(s) associated with the one or more subsequent incremental archives may be missing data chunks necessary to recover the object(s). An object may refer to a data object (e.g., files, virtual machines, databases, applications, containers, etc.).

Furthermore, a first object associated with the initial archive may include data that is referenced by a second object associated with a subsequent incremental archive. When a data lock period for the initial archive expires, the data associated with the initial archive is unprotected and may be subject to malicious activity. For example, the first object associated with the initial archive may be intentionally deleted by a bad actor. As a result, the second object associated with the subsequent incremental archive is unrecoverable because some of the data chunks necessary to recover second object associated with the subsequent incremental archive have been deleted.

Techniques to manage and secure archived deduplicated data are disclosed herein. Although the techniques are described with respect to archived deduplicated data, the techniques disclosed herein may be applicable whenever a data management operation (e.g., backup, migration, replication, tiering, etc.) is performed for a cohort of data that is provided from a first storage system to a second storage system and stored as deduplicated data at the second storage system. The second storage system may be a cloud storage or a remote storage system, such as a remote cluster. The techniques described herein are described with respect to a cloud storage but are applicable for a remote storage system.

A plurality of archives may be performed for a source system and the data associated with the plurality of archives may be stored in a first performance storage class of a cloud storage associated with a cloud storage provider. The cloud storage provider may provide an entity associated with the source system the ability to specify one or more data management policies for the plurality of archives. For example, the one or more data management policies may include a retention policy for an archive, a retention policy for an object associated with an archive, a data lock policy for an archive, a data lock policy for an object associated with an archive, a tiering policy for an archive, and/or a tiering policy for an object associated with an archive. In some embodiments, the policies associated with an object included in an archive is the same as other objects included in the archive. The policies associated with an object included in an archive may be the same or different than other objects included in the archive. For example, a first object included in the archive may be subject to a two year data lock period while a second object included in the archive may be subject to a five year data lock period.

The retention policy specifies a retention period. A retention period is the amount of time in which an archive or an object associated with an archive is to be stored in cloud storage before the archive or object associated with the archive is eligible to be removed from cloud storage. The retention period begins when the archive or the archive that includes the object is stored in cloud storage (e.g., archive creation time). In some embodiments, the retention period is explicitly specified when the archive is stored in cloud storage (e.g., a specific end date). In some embodiments, the retention period is specified by provided a specific end date at any time the archive is stored in cloud storage.

The data lock policy specifies a data lock period. A data lock period is the amount of time in which an archive or an object associated with an archive is locked (e.g., write once read many (WORM) protected). That is, data chunks associated with the archive or the object associated with the archive cannot be deleted or modified during the data lock period, by any user, regardless of permissions. The data lock period begins when the archive or the object associated with the archive is stored in the cloud storage. A data lock period is specified for an archive or an object associated with the archive prior to the archive being stored in cloud storage.

The tiering policy may include an archive tiering policy and an object tiering policy. A tiering policy may indicate one or more conditions for which an archive or an object associated with an archive is to be migrated from a first performance storage class (e.g., Amazon Simple Storage Service (S3), Microsoft Azure, Google Cloud®, etc.) to a different performance storage class (e.g., Amazon S3 Glacier, Amazon S3 Glacier Deep Archive).

An archive is comprised of chunk objects, metadata objects, and an archive metadata object. A chunk object is configured to store a plurality of data chunks that are associated with one or more objects (e.g., a file, a virtual machine, a database, an application, a container, a pod, etc.). The data content associated with the one or more objects is comprised of a plurality of chunk objects. Each of the plurality of chunk objects is comprised of one or more data chunks. In some embodiments, an object associated with a subsequent archive references one or more data chunks of a chunk object associated with a previous archive because the data chunks stored in the first performance storage class are deduplicated. In some embodiments, an object associated with a subsequent archive does not reference one or more data chunks of a chunk object associated with a previous archive even though one or more data chunks of the object associated with the subsequent archive are already stored in the first performance storage class.

A metadata object is configured to store metadata that enables the data chunks associated with an archived object to be located. The metadata object stores a serialized version of a tree data structure as a flat set of data. Each block of the metadata object corresponds to a node of the tree data structure.

An archive metadata object is configured to store metadata associated with an archive, which may include file system permissions (e.g., user access permissions to file system), type of object, timestamp associated with a source storage snapshot, a pointer to a block of a metadata object that corresponds to a root node of a tree data structure, expiration date, etc. Each archive is associated with a corresponding archive metadata object.

The different data management policies specified by an entity associated with a source system may cause conflicts in managing the archived data associated with the source system. An archive manager may determine how a conflict is to be resolved. In some embodiments, an archive manager is included in a storage system. In some embodiments, an archive manager is included in a cloud server located in a data plane.

A first technique to manage and secure deduplicated data is implemented each time an archive is stored to the cloud storage. The cloud storage may enable a data lock property and an expiration date to be set for objects associated with an archive. The data lock property indicates whether or not an object associated with an archive can be modified or deleted by any user regardless of permissions, while the object associated with the archive is stored at the cloud storage. The expiration date indicates a date at which the one or more chunk objects associated with the object may be subject to garbage collection.

In some embodiments, the data lock property is set for an entire archive and as a result, all objects associated with the archive inherit the data lock property. In some embodiments, the data lock property is set for individual objects included in an archive. An object is associated with one or more chunk objects, one or more metadata objects, and an archive metadata object. The one or more chunk objects, the one or more metadata objects, and the archive metadata object associated with the object also inherit the data lock property.

In some embodiments, the data lock property is not enabled for an object and the expiration date for the object is an expiration date of the retention period. In some embodiments, the data lock property is enabled for an object and the expiration date for the object is either an expiration date of the retention period or an expiration date of the data lock period, whichever expires last.

At a first point in time, an archive manager stores data associated with a first archive to cloud storage. The archive manager may enable a data lock for some or all of the objects associated with the first archive (e.g., the data lock property was enabled for these objects) and establish a corresponding expiration date for each of the objects associated with the first archive.

At a second point in time, the archive manager stores data associated with a second archive to cloud storage. To reduce the amount of data that is data that is stored in cloud storage, the second archive is an incremental archive. As a result, some of the objects associated with the second archive may share data chunks with objects associated with the first archive. For example, an object associated the second archive may reference data chunk(s) included in a chunk object associated with the first archive. Subsequently, the archive manager updates the expiration date for the chunk object associated with the first archive to match the expiration date for the object associated with the second archive, if the expiration date for the object associated with the second archive expires after the expiration date for the chunk object associated with the first archive. Otherwise, the expiration date for the chunk object associated with the first archive is maintained. This prevents data corruption issues for the object associated with the second archive because if the expiration date for the chunk object associated with the first archive is not extended to match the expiration date for the object associated with the second archive, then the data chunks included in the chunk object associated with the first archive may be modified or deleted at any time between the expiration dates.

A second technique to manage and secure deduplicated data is implemented when a garbage collection process is performed. A garbage collection process may be performed to remove data from the first performance storage class of the cloud storage. The garbage collection process is configured to remove a chunk object from the first performance storage class of the cloud storage when a retention period for the archive that includes the chunk object or a retention period for the object associated with the archive that includes the chunk object has expired. However, removing the chunk object may cause data integrity issues because one or more other objects associated with one or more other archives may reference one or more data chunks included in the chunk object.

When an archive manager determines that a retention period for a chunk object associated with a first archive has expired, the archive manager may prevent data corruption issues from occurring by determining whether one or more data chunks included in the chunk object are referenced. The term "first archive" may refer to the initial archive of a snapshot of a source storage of a source system or to a previous archive of a snapshot of the source storage of the source system. In the event none of the data chunks included in the chunk object associated with the first archive are referenced by one or more objects associated with one or more other archives, then the chunk object is removed from the first performance storage class of the cloud storage via a garbage collection process unless the chunk object is subject to a data lock period. In this scenario, the chunk object is maintained in the first performance storage class of the cloud storage until the data lock period expires.

In the event one or more data chunks included in the chunk object associated with the first archive are referenced by one or more objects associated with one or more other archives, then the archive manager may determine whether the one or more objects associated with the one or more other archives are subject to a corresponding data lock period. In the event the one or more objects associated with the one or more other archives are not subject to a corresponding data lock period, then the archive manager extends a retention period associated with the chunk object until a last retention period associated with the one or more other archives expires. The last retention period associated with the one or more other archives may be a retention period associated with one of the other archives or a retention period associated with an object included in one of the other archives that references the chunk object.

In the event the one or more objects associated with the one or more other archives are subject to a corresponding data lock period, then the archive manager extends a retention period associated with the chunk object to match a corresponding data lock period associated with the one or more other archives. In some embodiments, the chunk object is referenced by another object associated with a different archive. The other object associated with the different archive is subject to a data lock period and a retention time period. The retention time period of the chunk object is extended to expire when the data lock period of the other object associated with the different archive expires or when the retention period for the other object associated with the different archive expires, whichever has a later expiration date. In some embodiments, the chunk object is referenced by a plurality of objects associated with a plurality of different archives. The retention time period of the chunk object associated with the object is extended to expire when the latest of the data lock periods of the plurality of objects associated with the plurality of different archives expires and when the latest of the retention time periods of the plurality objects associated with the plurality of different archives expires (e.g., when they all expire).

Extending the data lock associated with a chunk object to match a retention period and/or a data lock period associated with one or more objects that reference one or more data chunks included in the chunk object ensures data integrity of the data stored in the first performance storage class of the cloud storage because it prevents referenced data chunk(s) needed to restore one or more objects from one or more subsequent archives from being intentionally or accidentally removed from the first performance storage class of the cloud storage.

The archive manager subsequently monitors the first performance storage class and at a later point in time determines whether the extended data lock period associated with the chunk object has expired. In the event the extended data lock period associated with the chunk object has expired, the chunk object is removed from the first performance storage class of the cloud storage via a garbage collection process. In the event the extended data lock period associated with the chunk object has not expired, the file system manager maintains the chunk object associated with the first archive in the first performance storage class of the cloud storage until the extended data lock period expires.

A third technique to manage and secure deduplicated data is implemented when an object is initially archived to a first performance storage class of a cloud storage. As mentioned above, data chunks stored in the first performance storage class of the cloud storage may be deduplicated. However, deduplicating data chunks may prevent a chunk object from being removed from the first performance storage class via a garbage collection process because the expiration date associated with the chunk object continues to be extended as an increasing number of archived objects reference one or more data chunks included in the chunk object.

Prior to a batch of data chunks being stored in a chunk object, the archive manager may determine whether any of the data chunks included in the batch are already stored at the first performance storage class of the cloud storage. In some embodiments, some of the data chunks are determined to be already stored at the first performance storage class of the cloud storage. For these determined data chunks, the archive manager determines a corresponding chunk object. The archive manager determines for a determined chunk object, one or more evaluation metrics, such as a percentage of data chunks of the determined chunk object that have expired and/or whether an expiration date associated with the determined chunk object is within an expiration threshold period. In some embodiments, in the event a percentage of data chunks of the determined chunk object that have expired is not greater than an expiration threshold percentage or an expiration date associated with the determined chunk object is not within an expiration threshold period, the archive manager determines to generate, for the one or more data chunks of the batch that match one or more data chunks of the determined chunk object, a metadata object, as disclosed herein, to reference the determined chunk object.

In some embodiments, in the event a percentage of data chunks of the determined chunk object that have expired is greater than an expiration threshold percentage and an expiration date associated with the determined chunk object is within an expiration threshold period, the archive manager determines to store in a new chunk object the one or more data chunks of the batch that match one or more data chunks of the determined chunk object. This enables the chunk object to be removed from the first performance storage class and reduces the amount of storage used to store archived data. This may reduce the costs associated with maintaining archived data for an entity associated with a source system.

A fourth technique to manage and secure deduplicated data is implemented when an archived object is migrated from a first performance storage class of a cloud storage to a second performance storage class of the cloud storage. There are costs associated with storing data chunks associated with the archived object in the first performance storage class. Such costs may be reduced by migrating the archived object to a different performance storage class.

A user associated with a source storage may specify a tiering policy. In some embodiments, a tiering policy is specified for an archive. The archive tiering policy may indicate that the data chunks associated with the archive are to be migrated to a different performance storage class after a particular amount of time has passed (e.g., 30 days). The archive tiering policy may indicate that the data chunks associated with the archive are to be tiered to a different performance storage class in the event none of the data chunks associated with the archive have been referenced by another archive. The archive tiering policy may indicate that the data chunks associated with the archive are to be tiered to a different performance storage class in the event none of the objects associated with the archive have been accessed within a threshold period.

In some embodiments, a tiering policy is specified for an object included in an archive. The object tiering policy may indicate that the data chunks associated with the object are to be tiered to a different performance storage class after a particular amount of time has passed (e.g., 60 days). The object tiering policy may indicate that data chunks associated with the object are to be tiered to a different performance storage class in the event none of the data chunks associated with the object have been referenced. The object tiering policy may indicate that the data chunks associated with the object are to be tiered to a different performance storage class in the event the object has not been accessed within a threshold period (e.g., either directly via the archive or indirectly via another archive).

A tiering policy condition associated with the archive tiering policy or the object tiering policy may have been satisfied. In response to the tiering policy condition being satisfied, the archive manager may determine, for each of the one or more chunk objects associated with the archived object, whether one or more data chunks included a chunk object are referenced by one or more other objects. In the event one or more data chunks associated with a chunk object are referenced by one or more other archived objects, the object is maintained in the first performance storage class of the cloud storage until all the data chunks associated with the object are unreferenced by one or more other archived objects. In the event one or more data chunks associated with a chunk object are not referenced by one or more other archived objects, the archived object and its associated chunk objects are migrated from the first performance storage class of the cloud storage to the second performance storage class of the cloud storage. This may prevent data corruption issues because it prevents referenced data chunk(s) needed to restore one or more objects from one or more subsequent archives stored in the first performance storage class from being migrated to a different performance storage class of the cloud storage.

FIG. 1A is a block diagram illustrating a system for managing objects stored in a remote storage in accordance with some embodiments. In the example shown, system 100 includes a client-side component 104 that is connected to data plane 112 via connection 110 and connected to cloud storage 122 via connection 120. In some embodiments, connection 110 is a gRPC connection or other type of connection. In some embodiments, connection 120 is a HTTPS connection or other type of connection. In some embodiments, connections 110, 120 may be intermittent connections. The connection between client-side component 104 and data plane 112 or between client-side component 104 and cloud storage 122 may be a wireless or wired connection. Connections 110, 120 may communicate data and/or information via a local area network, a wide area network, a storage area network, campus area network, metropolitan area network, system area network, intranet, the Internet, and/or a combination thereof. Cloud server 113 is connected to cloud storage 122 via connection 130.

The one or more client-side components 104 are located in datacenter 102 (e.g., real datacenter or virtual datacenter) that is associated with an entity (e.g., a user, an organization, a business, an enterprise, a government, etc.). In some embodiments, one or more client-side components 104 are located in cloud environment 121, such as in data plane 112. A client-side component may be a virtual machine, a container, a server, an application, etc. The one or more client-side components 104 are connected (e.g., temporarily or persistently) to source system 103. In some embodiments, the one or more client-side components 104 are included in source system 103. In some embodiments, source system 103 is a primary system. In some embodiments, source system 103 is a secondary storage system that backed up data from other sources (not shown). Source system 103 may be comprised of one or more computing devices (e.g., servers, desktops, laptops, etc.).

In some embodiments, the one or more client-side components are included in a storage system 105. Storage system 105 is configured to back up content from source system 103. In some embodiments, the storage nodes of storage system 105 are homogenous nodes where each storage node has the same capabilities (e.g., processing, storage, memory, etc.). In some embodiments, at least one of the storage nodes of the secondary storage system is a heterogeneous node with different capabilities (e.g., processing, storage, memory, etc.) than the other storage nodes of secondary storage system.

In some embodiments, a storage node of storage system 105 includes a processor, memory, and a plurality of storage devices. The plurality of storage devices may include one or more solid state drives, one or more hard disk drives, or a combination thereof. Backed up data may be stored in the one or more solid state drives, one or more hard disk drives, or a combination thereof.

In some embodiments, a storage node of storage system 105 includes a processor and memory, and is coupled to a separate storage device. The separate storage device may include one or more storage devices (e.g., flash storage devices). A storage device may be segmented into a plurality of partitions. Each of the storage nodes may be allocated one or more of the partitions. The one or more partitions allocated to a storage node may be configured to store data associated with some or all of the changed objects that were backed up to the secondary storage system. For example, the separate storage device may be segmented into 10 partitions and the secondary storage system may include 10 storage nodes. A storage node of the 10 storage nodes may be allocated one of the 10 partitions.

In some embodiments, a storage node of storage system 105 includes a processor, memory, and a storage device. The storage node may be coupled to a separate storage device. The separate storage device may include one or more storage devices. A storage device may be segmented into a plurality of partitions. Each of the storage nodes may be allocated one or more of the partitions. The one or more partitions allocated to a storage node may be configured to store data associated with some or all of the changed objects that were backed up to the storage system. For example, the separate storage device may be segmented into 10 partitions and the secondary storage system may include 10 storage nodes. A storage node of the 10 storage nodes may be allocated one of the 10 partitions.

Source system 103 includes content (e.g., virtual machines, applications, files, filesystem data, containers, metadata, database, etc.) that is to be archived to cloud storage 122. A client-side component is configured to receive the content to be archived from source system 103 and to archive the received content. In some embodiments, the client-side component is configured to archive some or all of the received content to cloud storage 122. In some embodiments, the client-side component is configured to archive some of the received content to cloud storage 122 via storage 116 included in data plane 112.

Data plane 112 is configured to orchestrate how content associated with source system 103 is stored in cloud storage 122. For example, content associated with source system 103 may be stored in a first performance storage class 123 (e.g., Amazon Simple Storage Service (S3)), a second performance storage class 124 (e.g., Amazon S3 Glacier), or a third performance storage class 125 (e.g., Amazon S3 Glacier Deep Archive). Although FIG. 1 depicts cloud storage 122 as having three performance storage classes, cloud storage 122 may have n performance storage classes. Each of the performance storage classes corresponds to an object storage provided by a cloud provider (e.g., Amazon Web Services™, Microsoft™ Azure, Google Cloud™, etc.) that provides cloud environment 121 (e.g., public cloud, private cloud, hybrid cloud, etc.). The speed at which data may be accessed is different depending on whether the data is stored in the first performance storage class 123, the second performance storage class 124, or the third performance storage class 125.

Data plane 112 includes one or more cloud servers 113 (e.g., one or more EC2 instances). The one or more cloud servers 113 may be associated with corresponding processors, corresponding memory, and corresponding storage. In some embodiments, data plane 112 includes multiple sets of one or more cloud servers 113. For example, data plane 113 may include a first set of one or more cloud servers 113 that is associated with a first region and a second set of one or more cloud servers 113 that is associated with a second region.

The one or more cloud servers 113 may receive an indication that a client-side component 104 stored one or more data chunks at chunk objects stored in a performance storage class of cloud storage 122. The received indication may indicate the client-side component has finalized sending the one or more data chunks.

File system manager 115 is configured to generate archive metadata for the one or more data chunks stored in the cloud storage by the client-side component. The archive metadata may be comprised of a plurality of data structures, such as a tree data structure, an archive chunk metadata data structure, and/or a chunk object metadata data structure. The one or more cloud servers 113 include a metadata store 117 that is configured to store the archive metadata. Metadata store 117 is included in a memory or a storage of cloud servers 113.

A tree data structure is configured to store metadata that enables data chunks associated with an archive to be located in cloud storage 122. The tree data structure is generated each time an archive of a snapshot of a source storage is performed. An example of the tree data structure is a snapshot tree, which may be based on a B+ tree structure (or other type of tree structure in other embodiments).

A snapshot tree may provide a view of a source storage of source system 103 at a particular point in time. The snapshot tree includes a root node, one or more levels of one or more intermediate nodes associated with the root node, and one or more leaf nodes associated with an intermediate node of the lowest intermediate level. The root node of a snapshot tree includes one or more pointers to one or more intermediate nodes. Each intermediate node includes one or more pointers to other nodes (e.g., a lower intermediate node or a leaf node). A leaf node may store file system metadata (e.g., owner, created, last update, size, file permissions, etc.), data associated with an object that is less than or equal to a limit size (e.g., 256 kB), an identifier of a data brick, one or more pointers to one or more metadata structures (e.g., Blob structure), etc. A leaf node of the snapshot tree may correspond to an inode.

A metadata structure may be generated for an object (e.g., a content file, a virtual machine, a container, an application, a database, etc.) that is greater than the limit size (e.g., 256 kB) and was included in the source system content that was archived to the cloud storage. The metadata structure is configured to store the metadata associated with an object that enables the data chunks associated with the object to be located. The metadata structure includes a root node, one or more levels of one or more intermediate nodes associated with the root node, and one or more leaf nodes associated with an intermediate node of the lowest intermediate level. A metadata structure is similar to a snapshot tree, but a leaf node of a metadata structure includes an identifier of a data brick associated with one or more data chunks of the object and metadata associated with the one or more data chunks (e.g., chunk identifier, chunk object identifier, etc.). A leaf node of the snapshot tree may include a pointer to a root node of the metadata structure corresponding to an object. The location of the one or more data chunks associated with a data brick may be identified using an archive chunk metadata data structure and/or a chunk object metadata data structure.

An archive chunk metadata data structure (e.g., a table) includes a plurality of entries. Each entry associates a chunk identifier associated with a data chunk with a chunk object identifier corresponding to a chunk object storing the data chunk.

A chunk object metadata data structure (e.g., a table) includes a plurality of entries. Each entry corresponds to a chunk object and associates a chunk object identifier for the chunk object with one or more chunk identifiers corresponding to one or more data chunks stored in the chunk object and metadata associated with the chunk object (e.g., offset information of data chunks within the chunk object).

The one or more data chunks associated with a data brick may be located based on the archive chunk metadata data structure and the chunk object metadata data structure. For example, a first data brick having a first brick identifier may be associated with a first chunk identifier (e.g., secure hash algorithm 1 (SHA-1) hash value). The first chunk identifier may be used in conjunction with the archive chunk metadata data structure to identify a chunk object identifier. A chunk object having the identified chunk object identifier is comprised of a plurality of data chunks. The chunk object metadata data structure may be used to identify a corresponding location of a data chunk. The chunk object metadata data structure may include corresponding offset information for a data chunk within a chunk object. In some embodiments, a corresponding location for the one or more data chunks associated with the data brick are stored in a leaf node of a tree data structure.

File system manager 115 may generate a metadata object that corresponds to a tree data structure. A metadata object is a serialized version of a tree data structure and is comprised of a flat set of data that includes a plurality of data blocks where each data block of the flat set of data corresponds to a node of the tree data structure. A data block that corresponds to a root node or intermediate node of the tree data structure includes a file offset to another data block of a flat set of data. A data block that corresponds to a leaf node of a snapshot tree includes a file offset to a data block corresponding to a root node of a metadata structure. A data block that corresponds to a leaf node of a metadata structure includes a reference to a storage location for one or more data chunks with which the leaf node is associated (e.g., a chunk object). A storage of a storage node of storage system 105 or cloud server 113 may be less reliable and/or more expensive than cloud storage 122. The metadata for the one or more data chunks may be serialized and stored at cloud storage 122 to ensure that the metadata for the one or more data chunks is not lost in the event the storage of a storage node or a cloud server fails.

Data plane 112 includes archive manager 118 that is configured to determine when data associated with source system 103 is to be archived to cloud storage 122 according to an archive policy. The archive policy may indicate an archive is to be performed periodically (e.g., daily, weekly, monthly, etc.), when an object is accessed less than an access frequency threshold period (e.g., accessed less than five times in the past six months), or in response to a user command.

Archive manager 118 may provide to the one or more client-side components 104 a specification of content to be archived from source system 103 to cloud storage 122. In some embodiments, the specification of content describes a full archive of source system 103. In some embodiments, the specification of content describes an incremental archive of source system 103. An incremental archive of source system 103 includes data stored on source system 103 that was not previously archived. After a full archive of source system 103 is performed, the subsequent archives of source system 103 may be incremental archives (e.g., incremental forever). In some embodiments, the specification of content describes a performance storage class for the data associated with an archive. For example, the one or more client-side components 104 may provide the data associated with an archive of a snapshot of source system 103 to the first performance storage class 123, the second performance storage class 124, or the third performance storage class 125.

In some embodiments, the specification of content describes a full archive of an object included in source system 103. In some embodiments, the specification of content describes an incremental archive of an object included in source system 103. In some embodiments, the specification of content describes a performance storage class for one or more objects stored on source system 103. For example, the one or more client-side components 104 may tier an archive of an object stored on source system 103 to the first performance storage class 123, the second performance storage class 124, or the third performance storage class 125.

In some embodiments, the one or more client-side components 104 are configured to receive the content in a plurality of portions from source system 103. For each received portion of content, a client-side component divides the received portion of content into a plurality of data chunks. In some embodiments, a specification of content to be archived to cloud storage 122 is received from archive manager 118. In some embodiments, a specification of content to be archived to cloud storage 122 is received from source system 103. In some embodiments, the plurality of data chunks may be of variable size. The one or more client-side components 104 may generate corresponding chunk identifiers (e.g., SHA-1 identifier, SHA-2 identifier, SHA-256 identifier, etc.) for each of the plurality of data chunks included in a portion of received content.

A client-side component may identify one or more data chunks of the plurality of data chunks that are to be sent via network connection 120 to cloud storage 122 at least in part by sending to file system manager 115 the corresponding chunk identifiers for each of the plurality of data chunks included in a portion of received content. In response to receiving the corresponding chunk identifiers for each of the plurality of data chunks, file system manager 115 is configured to compare each of the corresponding chunk identifiers to chunk identifiers included in an archive chunk metadata data structure. The chunk identifiers included in the archive chunk metadata data structure indicate at least some of the data chunks that are stored in in the first performance storage class 123 of cloud storage 122.

File system manager 115 is configured to provide the client-side component a data structure that indicates the one or more chunk identifiers of the one or more received chunk identifiers that are not included in the archive chunk metadata data structure. In response to receiving the data structure, the client-side component is configured to use the data structure to identify the one or more data chunks of the portion of the received content that are to be sent via network connection 120 to be stored at cloud storage 122.

File system manager 115 may also provide an indication of one or more chunk objects of performance storage class 123 to which a client-side component may write the one or more data chunks associated with the one or more chunk identifiers included in the data structure. The indication of the one or more chunk objects includes corresponding chunk object identifiers for the one or more chunk objects. In some embodiments, the one or more chunk objects include one or more new chunk objects, one or more existing chunk objects, and/or one or more chunk objects yet to be created. In some embodiments, file system manager 115 periodically (e.g., every hour) provides to the one or more client-side components 104 an indication of a set of one or more chunk objects.

A client-side component may receive an encryption key from encryption key manager 119. Encryption key manager manages encryption keys for a plurality of storage tenants. The received encryption key is particular to the storage tenant. In some embodiments, the encryption key enables read access for a chunk object associated with the storage tenant at a credential level or write access for a new chunk object associated with the storage tenant at a credential level. In some embodiments, the encryption key enables read or write access for a new chunk object associated with the storage tenant at a prefix level. For example, a prefix may be a partial or full file path in the cloud storage. A prefix may be unique to a storage tenant. Some or all chunk objects of a particular storage tenant may be stored in cloud storage and share a prefix. The encryption key may expire after a particular amount of time. Source system 103 may be hacked and having the encryption key expire after the particular amount of time may prevent a hacker from accessing any of the chunk objects stored at cloud storage 122.

A client-side component may combine a plurality of the identified data chunks into one or more batches. The client-side component archives a batch of data chunks to cloud storage 122 by encrypting the data chunks included in the batch with the received encryption key and writing the encrypted data chunks to one of the chunk objects identified by file system manager 115. In some embodiments, the data chunks are compressed prior to being encrypted. The client-side component may write the encrypted data chunks to a chunk object associated with the first performance storage class 123, the second performance storage class 124, or the third performance storage class 125.

After a client-side component has written some or all of one or more batches of data chunks to one or more chunk objects of cloud storage 122, the one or more client-side components 104 may be configured to provide file system manager 115 an indication that the one or more chunk objects have been finalized. A chunk object may be finalized when cloud storage 122 receives and stores all of the plurality of data chunks associated with the chunk object. In response to receiving the indication, file system manager 115 is configured to complete generating metadata for the one or more data chunks stored in cloud storage 122 by one of the one or more client-side components 104. The metadata for the one or more data chunks may include a tree data structure, an archive chunk metadata data structure, and/or chunk object metadata data structure.

Figure 1B:
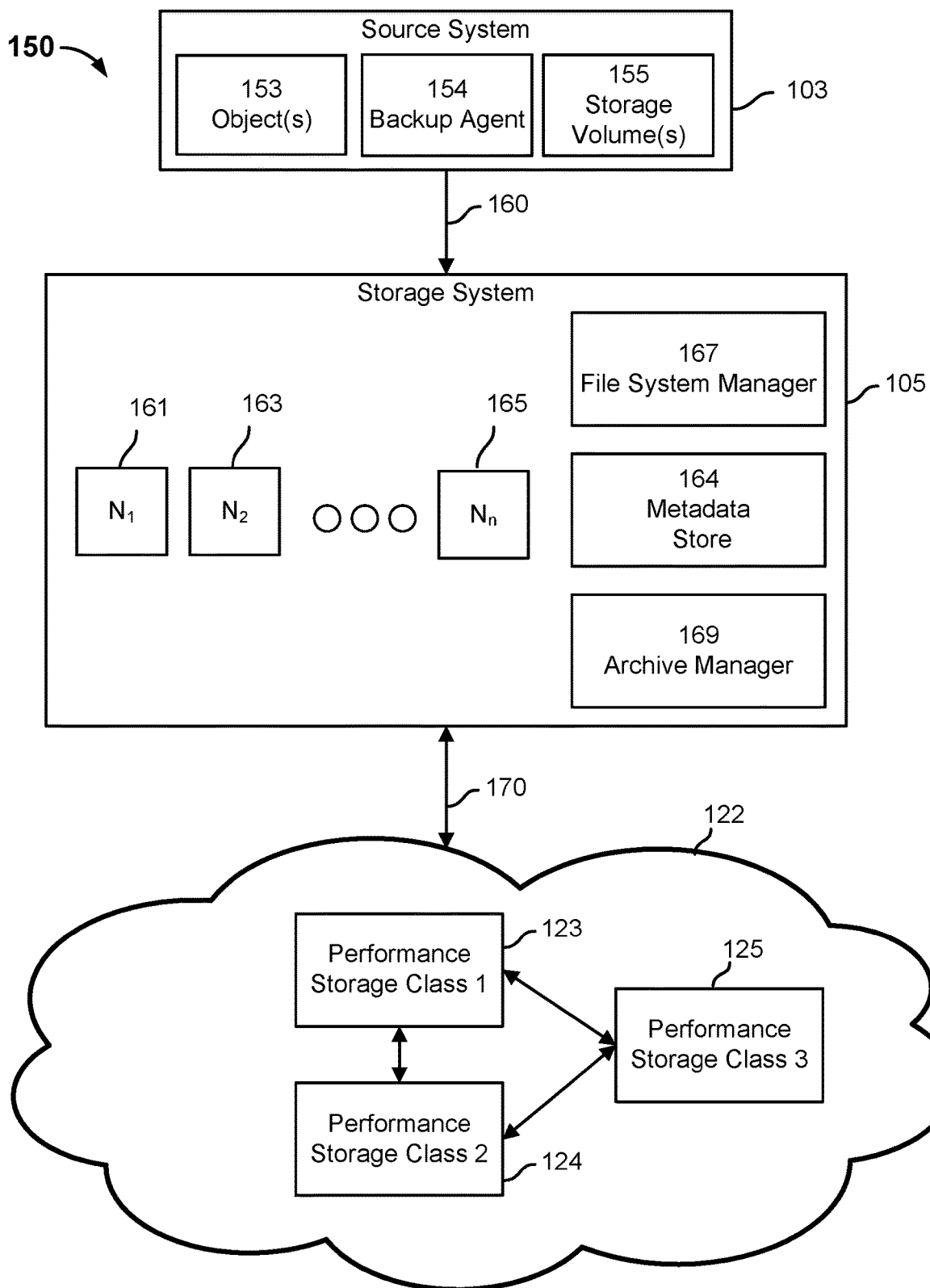
FIG. 1B is a block diagram illustrating a system for managing objects stored in a remote storage in accordance with some embodiments.

FIG. 1B is a block diagram illustrating a system for managing objects stored in a remote storage in accordance with some embodiments. In the example shown, system 150 includes source system 103, a storage system 105, and a cloud storage 122.

Source system 103 is a computing system that stores file system data. The file system data may include a plurality of files (e.g., content files, text files, etc.) and metadata associated with the plurality of files (e.g., creation time, owner, modification time, file size, etc.). A file may be referred to as an object herein. Source system 103 may be configured to run one or more objects 153. Examples of objects include, but are not limited to, a virtual machine, a database, an application, a container, a pod, etc. Source system 103 may include one or more storage volumes 155 that are configured to store file system data associated with source system 103. The file system data associated with source system 103 includes the data associated with the one or more objects. Source system 103 may be comprised of one or more servers, one or more computing devices, one or more storage devices, and/or a combination thereof. Snapshots of source system 103 may be performed at different points in time and stored in one of the one or more storage volumes 155.

A backup of source system 103 may be performed according to one or more backup snapshot policies. In some embodiments, a backup snapshot policy indicates that file system data is to be backed up on a periodic basis (e.g., hourly, daily, weekly, monthly, etc.), when a threshold size of data has changed, or in response to a command from a user associated with source system 103.

Backup agent 154 may be configured to cause source system 103 to perform a backup snapshot (e.g., a full backup snapshot or incremental backup snapshot). A full backup snapshot may include all of the file system data of source system 103 at a particular moment in time. In some embodiments, a full backup snapshot for a particular object of the one or more objects 153 is performed and the full backup snapshot of the particular object includes all of the object data (metadata, data content) associated with the particular object at a particular moment in time. In some embodiments, backup agent 154 is running on source system 103. In some embodiments, backup agent 154 is running in one of the one or more objects 153. In some embodiments, a backup agent 154 is running on source system 103 and a separate backup agent is running in one of the one or more objects 153. In some embodiments, an object includes a backup function and is configured to perform a backup snapshot on its own without backup agent 154. In some embodiments, source system 103 includes a backup function and is configured to perform a backup snapshot on its own without backup agent 154. In some embodiments, storage system 105 may provide instructions to source system 103, causing source system 103 to execute backup functions without backup agent 154.

Storage system 105 is comprised of a storage cluster that includes a plurality of storage nodes 161, 163, 165. Although three storage nodes are shown, storage system 105 may be comprised of n storage nodes. The storage nodes of storage system 105 may be configured in a manner as previously described. Storage system 105 may be configured to ingest a backup snapshot received from source system 103 and configured to store the data associated with the backup snapshot across the storage nodes 161, 163, 165 of the storage cluster.

Storage system 105 includes a file system manager 167 that is configured to organize the file system data of the backup snapshot using a tree data structure. The tree data structure may be used to capture different views of data. A view of data may correspond to a full backup snapshot, an incremental backup snapshot, a clone of data, a file, etc. The tree data structure allows a chain of snapshot trees to be linked together by allowing a node of a later version of a snapshot tree to reference a node of a previous version of a snapshot tree. The previous version of the snapshot tree may correspond to an earlier backup snapshot. For example, a root node or an intermediate node of a snapshot tree corresponding to a second backup snapshot may reference an intermediate node or leaf node of a snapshot tree corresponding to a first backup snapshot.

A snapshot tree is a representation of a fully hydrated restoration point because it provides a complete view of source system 103 or the one or more objects 153, or data generated on or by storage system 105 at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, storage system 105 maintains fully hydrated restoration points. Any file associated with source system 105, an object at a particular time and the object's contents, or a file generated on or by the storage system, for which there is an associated reference restoration point, may be determined from the snapshot tree, regardless if the associated restoration point was a full reference restoration point or an intermediate reference restoration point.

Metadata store 164 is configured to store backup metadata, such as a plurality of tree data structures, a backup chunk metadata data structure, and a backup chunk file metadata data structure. The tree data structures generated by file system manager 167 are similar to the tree data structures generated by file system manager 115. Metadata store 164 may be stored in a memory or storage of storage nodes 161, 163, 165.

A backup chunk metadata data structure includes a plurality of entries. Each entry associates a chunk identifier associated with a data chunk with a chunk file identifier corresponding to a chunk file storing the data chunk.

A chunk file metadata data structure includes a plurality of entries. Each entry corresponds to a chunk file and associates a chunk file identifier for the chunk file with one or more chunk identifiers corresponding to one or more data chunks stored in the chunk file and metadata associated with the chunk file (e.g., offset information of data chunks within the chunk file).

The one or more data chunks associated with a data brick may be located based on the backup chunk metadata data structure and the chunk file metadata data structure. For example, a first data brick having a first brick identifier may be associated with a first chunk identifier (e.g., SHA-1 hash value). The first chunk identifier may be used in conjunction with the backup chunk metadata data structure to identify a chunk file identifier. A chunk file having the identified chunk file identifier is comprised of a plurality of data chunks. The chunk file metadata data structure may be used to identify a corresponding location of a data chunk. The chunk file metadata data structure may include corresponding offset information for a data chunk within a chunk file and/or a size for the data chunk.

Storage system 105 includes archive manager 169 that is configured to archive the backed data of source system 103 to cloud storage 122. The backed up data of source system 103 may be archived to the first performance storage class 123, the second performance storage class 124, or the third performance storage class 125. Archive manager 169 may perform a full archive or an incremental archive. A full archive includes the data that was included in a full backup snapshot of source system 103. An incremental archive includes the data that was included in an incremental backup snapshot of source system 103.

Metadata store 164 may include an archive chunk metadata data structure and a chunk object metadata data structure. Archive manager 169 may update the archive chunk metadata data structure and chunk object metadata data structure in a similar manner as archive manager 118.

Figure 2A:
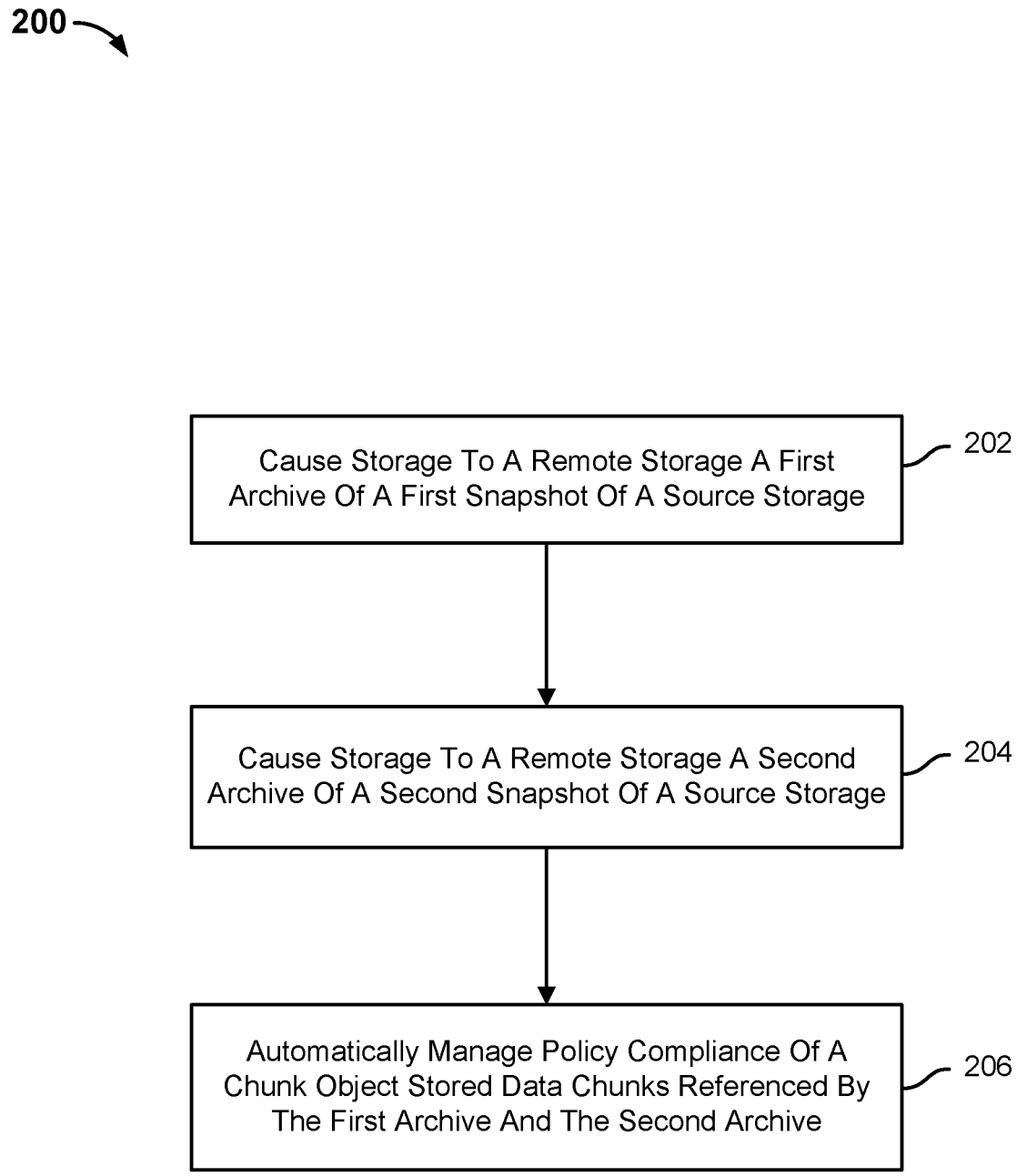
FIG. 2A is a flow diagram illustrating a process for managing cloud objects stored in a cloud storage in accordance with some embodiments.

FIG. 2A is a flow diagram illustrating a process for managing cloud objects stored in a cloud storage in accordance with some embodiments. In the example shown, process 200 may be implemented by an archive manager, such as archive manager 118.

A source storage (e.g., NAS device) may be configured to generate snapshots of the data stored in a storage volume of the source storage. Each snapshot captures a state of file system data associated with the source storage at different points in time. An archive policy may indicate a frequency at which an archive of the source storage is to be performed (e.g., daily, weekly, monthly, etc.).

At 202, a first archive of a first snapshot of a source storage is caused to be stored to a remote storage. A first snapshot captures a state of file system data associated with the source storage at a first point in time.

An archive manager of a cloud server may determine that a condition associated with the archive policy has been satisfied and sends to a client-side component coupled to the source storage a specification of content to be archived from the source storage to the remote storage. In some embodiments, the specification of content to be archived for a first archive describes a full archive of the source storage. In some embodiments, the specification of content to be archived describes a full archive of an object included in the source storage (e.g., file, virtual machine, container, application, etc.). In some embodiments, the specification of content to be archived for a first archive describes a performance storage class for one or more objects stored in the source storage.

In response to receiving the specification of content to be archived from the archive manager, the client-side component is configured to perform the first archive by requesting the content from the source storage. The source storage utilizes the first snapshot to provide the requested content in a plurality of portions to the client-side component. A portion of content may include metadata associated one or more objects stored in the source storage (e.g., owner, created, last update, size, permissions, etc.) and/or data content associated with the one or more objects stored in the source storage.

For each received portion of content, the client-side component divides the received portion of content into a plurality of data chunks, which may be variable-sized. The client-side component may generate corresponding chunk identifiers (e.g., SHA-1 identifier) for each of the plurality of data chunks included in a portion of received content, and provides data chunk metadata to a file system manager that is included in a cloud server.

In some embodiments, a source system chunks data associated with the content to be archived into a plurality of data chunks, determines a corresponding chunk identifier (e.g., SHA-1 hash value) for each of the plurality of data chunks, and sends the chunk identifiers to the client-side component. Subsequently, the client-side component provides data chunk metadata to the file system manager of a cloud server.

Data chunk metadata includes the corresponding chunk identifiers, corresponding data chunk sizes, and corresponding object offsets. The data chunk metadata indicates a sequence of data chunks within an object. For example, the data chunk metadata may indicate that a first data chunk having a chunk identifier of C1 is associated with an object offset of 0 MB-1 MB and has a data chunk size of 1 MB, a second data chunk having a chunk identifier of C2 is associated with an object offset of 1 MB-2 MB and has a data chunk of 1 MB, . . . , and an 8th data chunk identifier of C8 is associated with an object offset of 7 MB-8 MB and has a data chunk size of 1 MB.

In response to receiving the data chunk metadata, a file system manager of the cloud server may determine whether any of the one or more corresponding chunk identifiers are included in a chunk metadata data structure by comparing each of the corresponding chunk identifiers to chunk identifiers included in an archive chunk metadata data structure. The archive chunk metadata data structure stores information that associates a plurality of chunk identifiers with their corresponding chunk object identifiers. This indicates that a data chunk having a particular chunk identifier is stored in a chunk object having a particular chunk object identifier. The file system manager identifies the one or more chunk identifiers that are not included in the archive chunk metadata data structure and provides to the client-side component a data structure that includes the one or more identified chunk identifiers.

The file system manager provides an encryption key and a reference to a portion of a cloud storage where the one or more data chunks corresponding to the identified chunk identifiers are to be stored. The reference to a portion of the cloud storage may identify one or more chunk objects of the cloud storage to which the one or more data chunks are to be stored. The one or more chunk objects may include one or more new chunk objects, one or more existing chunk objects, and/or one or more chunk objects yet to be created.

In response to receiving the data structure, the encryption key, and the reference, the client-side component is configured to encrypt and write one or more data chunks corresponding to the one or more identified chunk identifiers to the one or more chunk objects associated with the provided reference location. In some embodiments, the client-side component has already chunked the one or more data chunks. In some embodiments, the client-side component requests from the source system the one or more data chunks identified in the data structure.

For each received portion of content, the client-side component is configured to provide the file system manager an indication that the one or more data chunks corresponding to the one or more identified chunk identifiers were written to the provided reference location. In response, the file system manager is configured to generate metadata (e.g., tree data structure, archive chunk metadata data structure, chunk object metadata data structure) that enables the one or more written data chunks to be located at the cloud storage. After the first archive is complete, the generated metadata provides a view (partial or complete) of the source storage at the first point in time. An archive manager may subsequently generate an archive metadata object and metadata objects for the first archive and store the generated objects at cloud storage.

At 204, a second archive of a second snapshot of the source storage is caused to be stored to a remote storage. A second snapshot captures a state of file system data associated with the source storage at a second point in time.

An archive manager may determine that a condition associated with the archive policy has been met and send to a client-side component coupled to the source storage a specification of content to be archived from the source storage to the remote storage. In some embodiments, the specification of content for a second archive describes an incremental archive of the source storage. An incremental archive of the source storage includes file system data that was not included in a previous archive of the source storage. In some embodiments, the specification of content for a second archive describes an incremental archive of an object included in the source storage. An incremental archive of an object includes object data that was not included in a previous archive of the object. In some embodiments, the specification of content describes a performance storage class for one or more objects stored in the source storage.

In response to receiving the specification of content from the archive engine, the client-side component is configured to perform the second archive by requesting the content from the source storage. The source storage utilizes the second snapshot to provide the requested second archive content in a plurality of portions to the client-side component.

Similar to the first archive stored at 202, the client-side component requests and receives the second archive content in a plurality of portions from the source system. For each received portion of content, the client-side component divides the received portion of content into a plurality of data chunks.

The client-side component may generate corresponding chunk identifiers (e.g., SHA-1 have value) for each of the plurality of data chunks included in a portion of received content. Data chunk metadata that includes the corresponding chunk identifiers, corresponding data chunk sizes, and corresponding object offsets are sent to a file system manager that is included in a cloud server.

In some embodiments, the source system chunks data associated with the content to be archived into a plurality of data chunks, determines a corresponding chunk identifier (e.g., SHA-1 hash value) for each of the plurality of data chunks, and sends the chunk identifiers to the client-side component. Subsequently, the client-side component provides data chunk metadata to the file system manager that is included in the cloud storage.

In response to receiving the data chunk metadata, the file system manager may determine whether any of the one or more corresponding chunk identifiers are included in an archive chunk metadata data structure by comparing each of the corresponding chunk identifiers to chunk identifiers included in the archive chunk metadata data structure.

The file system manager may identifier one or more corresponding chunk identifiers that are included in the archive chunk metadata data structure. The chunk identifiers included in the archive chunk metadata data structure indicate data chunks associated with the storage tenant that are already stored in a first performance storage class of a cloud storage. In some embodiments, portions of the second archive content were already stored in the first performance storage class of the cloud storage during a first archive of the source storage. If the client-side component were to write to the first performance storage class data chunk corresponding to chunk identifiers already included in the archive chunk metadata data structure, then the cloud storage would store duplicate copies of the same data chunks, which is an inefficient use of the cloud storage. Instead, the file system manager generates, as described herein, metadata for the second archive that references chunk objects storing data chunks included in the portion of content of the second archive. This enables an object included in the second archive to be accessed or restored without storing duplicate copies of the same data chunks.

The file system manager identifies one or more corresponding chunk identifiers that are not included in the archive chunk metadata structure. The file system manager is configured to provide to the client-side component a data structure that indicates one or more data chunks corresponding to the one or more identified chunk identifiers are to be stored to a first performance storage class of the cloud storage, an encryption key, and a reference to a portion of a cloud storage where the one or more data chunks corresponding to the one or more identified chunk identifiers are to be stored. In response, the client-side component completes the second archive in a similar manner as described for step 204. An archive manager may subsequently generate an archive metadata object and metadata objects for the second archive and store the generated objects at cloud storage.

At 206, policy compliance of a chunk object storing data chunks referenced by the first archive and the second archive is automatically managed. The first archive is associated with a first data policy and the second archive is associated with a second data policy. The first and second data policies may have a corresponding retention period, a corresponding data lock period, and/or a corresponding tiering policy. In some embodiments, the corresponding retention periods, the corresponding data lock periods, and/or the corresponding tiering policies are the same for the first and second data policies. In some embodiments, the corresponding retention periods, the corresponding data lock periods, and/or the corresponding tiering policies are different for the first and second data policies.

A retention period is the amount of time in which an archive or an object associated with an archive is to be stored in cloud storage before the archive or object associated with the archive is eligible to be removed from cloud storage.

A data lock period is the amount of time in which an archive or an object associated with an archive is locked (e.g., write once read many (WORM) protected). That is, data chunks associated with the archive or the object associated with the archive that are WORM protected cannot be deleted or modified during the data lock period by any user or process, regardless of their level of authority. In some embodiments, the data lock period is specified for all of the data associated with the archive. In some embodiments, the data lock period is specified for one or more objects included in the archive and their corresponding chunk object(s).

A tiering policy associated with an archive indicates conditions in which data associated with an archive is stored in a first performance storage class before being migrated to a second performance storage class. In some embodiments, the tiering policy is specified for all of the data associated with the archive. In some embodiments, the tiering policy is specified for one or more objects included in the archive and their corresponding chunk object(s).

The different data policies associated with the first archive and the second archive may cause conflicts in managing the data associated with the first and second archives. An archive manager of a cloud server or storage system is configured to determine how to resolve the conflicts.

For example, a first object associated with a first archive is comprised of one or more chunk objects. A first chunk object of the first object associated with the first archive may include one or more data chunks that are referenced by a second object associated with a second archive. A condition of the first data policy associated with the first archive may cause data chunks associated with the first chunk object to be removed from the cloud storage. For example, a retention period and/or a data lock period may have expired. A garbage collection process is configured to delete data chunks from chunk objects that are associated expired retention periods and/or expired data lock periods.

However, deleting data chunk(s) that are stored in the first chunk object and shared with the second object associated with the second archive causes data integrity issues for the second archive because the second object associated with the second archive becomes unrecoverable. Instead of deleting the one or more shared data chunks from the first chunk object, the file system manager automatically manages policy compliance of the first chunk object by extending an expiration date associated with the first chunk object (e.g., a retention period associated with the first chunk object and/or a data lock period associated with the first chunk object) to match an expiration date associated with the second object associated with the second archive (e.g., a retention period for the second object associated with the second archive and/or a data lock period for the second object associated with the second archive, whichever is the last to expire). This prevents the second object associated with the second archive from being unrecoverable. In some embodiments, the expiration date is extended when the second archive is stored at the cloud storage. In some embodiments, the expiration date is extended when the expiration date associated with the first chunk object expires.

In another example, the first object associated with the first archive may not have been accessed more than a threshold number of times within a threshold period. This may cause a tiering process to migrate the first object associated with the first archive including the first chunk object to a different performance storage class. However, migrating data chunk(s) that are stored in the first chunk object and shared with second object associated with the second archive causes data integrity issues for the second archive because the second object associated with the second archive becomes unrecoverable. Instead of migrating the first object associated with the first archive that includes the first chunk object, the archive manager automatically manages policy compliance of the first chunk object by maintaining the first chunk object in its current performance storage class until a retention period for the second object associated with the second archive expires, and/or a data lock period for the second object associated with the second archive expires, whichever is the last to expire. This prevents the second object associated with the second archive from becoming unrecoverable.

Figure 2B:
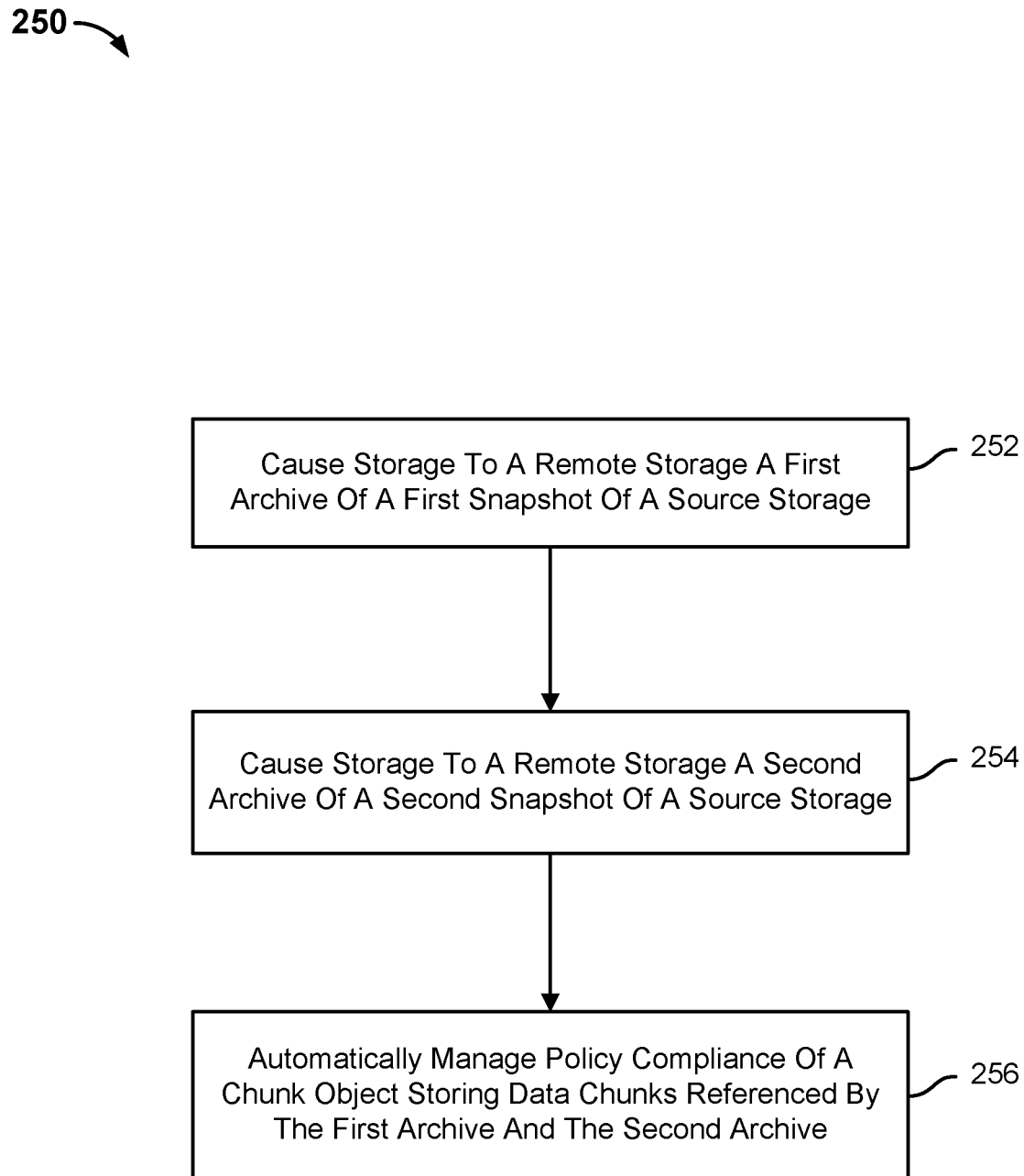
FIG. 2B is a flow diagram illustrating a process for managing cloud objects stored in a cloud storage in accordance with some embodiments.

FIG. 2B is a flow diagram illustrating a process for managing cloud objects stored in a cloud storage in accordance with some embodiments. In the example shown, process 200 may be implemented by an archive manager, such as archive manager 169.

At 252, a first archive of a first snapshot of a source storage is caused to be stored to a remote storage. An archive manager of a storage system may determine that a condition associated with the archive policy has been satisfied. The first archive may be a full archive of the first snapshot of the source storage or a full archive of an object included in the first snapshot of the source storage.

The storage system may store a tree data structure that corresponds to the first snapshot of the source storage. The storage system may traverse the tree data structure to locate the data chunks associated with the first snapshot of the source storage and send a copy of the data chunks associated with the first snapshot of the source storage to a first performance storage class of the cloud storage.

The storage system may subsequently update a backup chunk metadata data structure to associate a data chunk with a corresponding chunk object. The backup chunk metadata data structure includes a plurality of entries. Each entry associates a chunk identifier associated with a data chunk with a chunk file identifier of a chunk file storing the data chunk. The entry may be updated to associate the chunk identifier associated with the data chunk with a chunk object identifier of a chunk object storing the data chunk. In some embodiments, a copy of the data chunk is stored in the storage system and the cloud storage. The entry for the data chunk may associate the chunk identifier associated with the data chunk with a chunk file identifier of a chunk file storing the data chunk and a chunk object identifier of a chunk object storing the data chunk. In some embodiments, a data chunk is migrated from storage system to the cloud storage. The entry for the data chunk may associate the chunk identifier associated with the data chunk with a chunk object identifier of a chunk object storing the data chunk. An archive manager of the storage system may generate an archive metadata object and metadata objects for the first archive and store the generated objects at cloud storage.

At 254, a second archive of a second snapshot of the source storage is caused to be stored to a remote storage. An archive manager of a storage system may determine that a condition associated with the archive policy has been satisfied. The second archive may be an incremental archive of the second snapshot of the source storage, that is, the incremental archive of the second snapshot of the source storage includes data that not archived in the first archive of the first snapshot of the source storage. In some embodiments, the second archive is an incremental archive of an object included in the second snapshot of the source storage.

The storage system may store a tree data structure that corresponds to the second snapshot of the source storage. The storage system may traverse the tree data structure associated with the second snapshot of the source storage and identify the chunk identifiers associated with the data chunks associated with the second snapshot of the source storage. The storage system may compare each of the identified chunk identifiers with chunk identifiers included in the backup chunk metadata data structure. In the event an entry of the backup chunk metadata data structure corresponding to the identified data chunk stores a chunk object identifier of a chunk object storing the identified data chunk, the storage system does not provide the identified data chunk to the chunk storage. Instead, the storage system updates a node of the tree data structure that corresponds to the identified data chunk to reference the chunk object storing the identified data chunk.

In the event an entry of the backup chunk metadata data structure corresponding to the identified data chunk does not store a chunk object identifier of a chunk object storing the identified data chunk, the storage system sends a copy of the identified data chunk to a first performance storage class of the cloud storage and updates the backup chunk metadata data structure entry corresponding to the identified data chunk to reference the chunk object storing the identified data chunk.

In some embodiments, as discussed herein, a duplicate of the identified data chunk is stored in a new chunk object. The metadata associated with the second snapshot (e.g., tree data structures, metadata object) will reference the duplicate identified data chunk stored in the new chunk object and not reference the pre-existing chunk object.

An archive manager may generate an archive metadata object and metadata objects for the second archive and store the generated objects at cloud storage.

At 256, policy compliance of a chunk object storing data chunks referenced by the first archive and the second archive is automatically managed. The archive manager of the storage system may manage chunk objects associated with the first archive and the second archive in a similar manner as described with respect to step 206 of process 200.

Figure 3A:
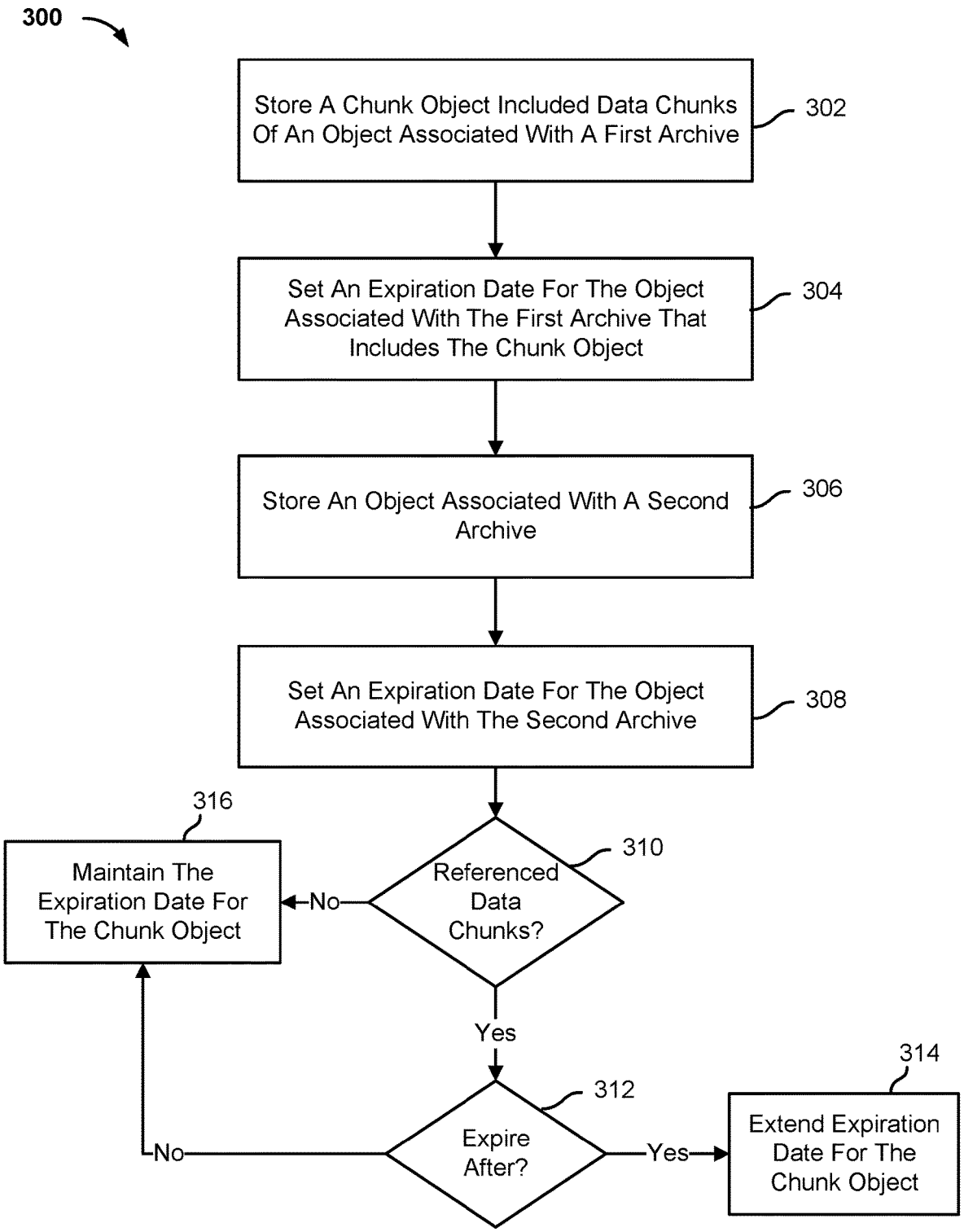
FIG. 3A is a flow diagram illustrating a process for automatically managing policy compliance of chunk objects stored in a remote storage in accordance with some embodiments.

FIG. 3A is a flow diagram illustrating a process for automatically managing policy compliance of chunk objects stored in a remote storage in accordance with some embodiments. In some embodiments, process 300 is implemented by an archive manager, such as archive managers 118, 169. In some embodiments, process 300 is implemented to perform some or all of step 206 of process 200 or step 256 of process 250.

At 302, a chunk object including data chunks of an object associated with a first archive is stored in a remote storage.

At 304, an expiration date is set for the object associated with the first archive that includes the chunk object. The chunk object including data chunks of the object associated with the first archive inherits the object expiration date. At 306, an object associated with a second archive is stored in the remote storage. At 308, an expiration date is set for the object associated with the second archive.

At 310, it is determined if any of the data chunks included in the chunk object are referenced by the object associated with the second archive. In the event the object associated with the second archive references any of the data chunks included in the chunk object, process 300 proceeds to 312. In the event the object associated with the second archive does not reference any of the data chunks included in the chunk object, process 300 proceeds to 316.

At 312, it is determined whether the expiration date for the object associated with the second archive expires after the expiration date for the object associated with the first archive that includes the chunk object. In the event the expiration date for the object associated with the second archive expires after the expiration date for the object associated with the first archive that includes the chunk object process 300 proceeds to 314. In the event the expiration date for the object associated with the second archive does not expire after the expiration date for the object associated with the first archive that includes the chunk object process 300 proceeds to 316.

At 314, the expiration date for the object associated with the first archive that includes the chunk object is extended to match the expiration date the object associated with the second archive.

At 316, the expiration date for the object associated with the first archive that includes the chunk object is maintained.

Figure 3B:
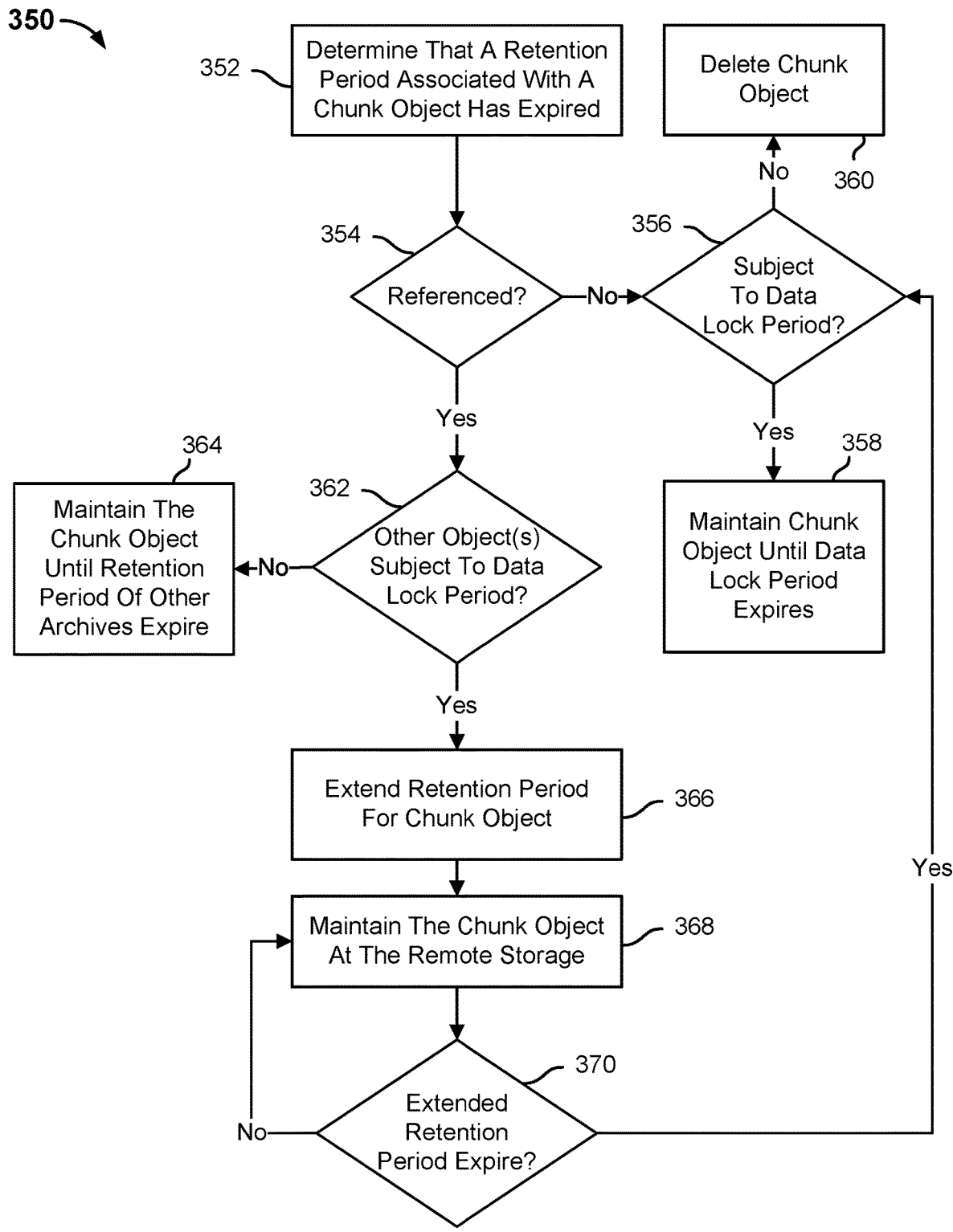
FIG. 3B is a flow diagram illustrating a process for automatically managing policy compliance of chunk objects stored in a remote storage in accordance with some embodiments.

FIG. 3B is a flow diagram illustrating a process for automatically managing policy compliance of chunk objects stored in a remote storage in accordance with some embodiments. In some embodiments, process 350 is implemented by an archive manager, such as archive managers 118, 169. In some embodiments, process 300 is implemented to perform some or all of step 206 of process 200 or step 256 of process 250.

At 352, it is determined that a retention period for a chunk object associated with an object has expired. In some embodiments, the retention period is the amount of time in which an archive that includes the chunk object must be stored in cloud storage before the chunk object is eligible to be removed from cloud storage. In some embodiments, the retention period is the amount of time in which an object associated with an archive that includes the chunk object must be stored in cloud storage before the chunk object is eligible to be removed from cloud storage. The chunk object inherits the maximum of the archive retention period or the object retention period.

For example, an object associated with a first archive may be stored in a cloud storage on day 1 and have a retention period of 30 days. An archive manager may determine that on day 31, the object and its associated chunk object(s) are to be deleted from the cloud storage.

At 354, it is determined whether one or more data chunks included in the chunk object are referenced by one or more objects associated with one or more other archives.

An archive manager may determine whether a data chunk is referenced by one or more objects associated with one or more other archives by traversing a plurality of tree data structures. Each tree data structure corresponds to a different archive. In some embodiments, a tree data structure may include a node (e.g., leaf node) that stores a chunk identifier corresponding to the data chunk. The archive manager may determine that the data chunk is referenced by one or more objects associated with one or more other archives in the event the same chunk identifier appears in one or more nodes of one or more other tree data structures.

In the event one or more data chunks included in the chunk object are not referenced by one or more objects associated with one or more other archives, process 350 proceeds to 356.

In the event one or more data chunks included in the chunk object are referenced by one or more objects associated with one or more other archives, process 350 proceeds to 362.

At 356, it is determined whether the object associated with the archive that includes the chunk object is subject to a data lock period. In some embodiments, a data lock period is specified for the object that includes the chunk object. In some embodiments, a data lock period is not specified for the object that includes the chunk object. In some embodiments, a data lock period is specified for the object, but has expired.

In the event it is determined that the object associated with the archive that includes the chunk object is subject to a data lock period, process 350 proceeds to 358 where the chunk object is maintained at the remote storage until the data lock period expires. For example, the object associated with archive that includes the chunk object may have a data lock period of 7 years. Even though the retention time period for the object has expired, the data lock period for the object prevents the object from being deleted from cloud storage until 7 years have passed since the object has stored in the cloud storage.

In the event it is determined that the object associated with the archive that includes the chunk object is not subject to a data lock period (e.g., no data lock was established or the data lock period expired), process 350 proceeds to 360 where the chunk object is deleted. In some embodiments, the chunk object is deleted via a garbage collection process. In some embodiments, the chunk object is selected for deletion by a user associated with a source system.

At 362, it is determined whether the one or more objects that reference one or more data chunks included in the chunk object are subject to a data lock period.

In the event the one or more objects that reference one or more data chunks included in the chunk object are not subject to a data lock period, then process 350 proceeds to 364 where the chunk object is maintained in cloud storage until all of the retention periods of the one or more other objects expire.

At 366, the retention period for the chunk object associated with the object is extended, if necessary. In some embodiments, the retention period for the chunk object associated with the object expires when the data lock period(s) associated with the one or more objects associated with the one or more other archives expires.

In some embodiments, the chunk object associated with the object is referenced by another object associated with a different archive. The other object associated with the different archive is subject to a data lock period and a retention time period. The retention time period of the chunk object associated with the object is extended to expire when the data lock period of the other object associated with the different archive expires or when the retention period for the other object associated with the different archive expires, whichever has a later expiration date.

In some embodiments, the chunk object associated with the object is referenced by a plurality of objects associated with a plurality of different archives. The retention time period of the chunk object associated with the object is extended to expire when the latest of the data lock periods of the plurality of objects associated with the plurality of different archives expires and when the latest of the retention time periods of the plurality objects associated with the plurality of different archives expires.

At 368, the chunk object is maintained at the remote storage. While the chunk object is maintained at the remote storage, one or more objects associated with one or more subsequent archives may reference one or more data chunks included in the chunk object and cause the retention period associated with the chunk object to be further extended.

At 370, it is determined whether the extended retention period has expired. In the event the extended retention period has not expired, process 350 returns to 368. In the event the extended retention period has expired, process 350 proceeds to 356.

Figure 4:
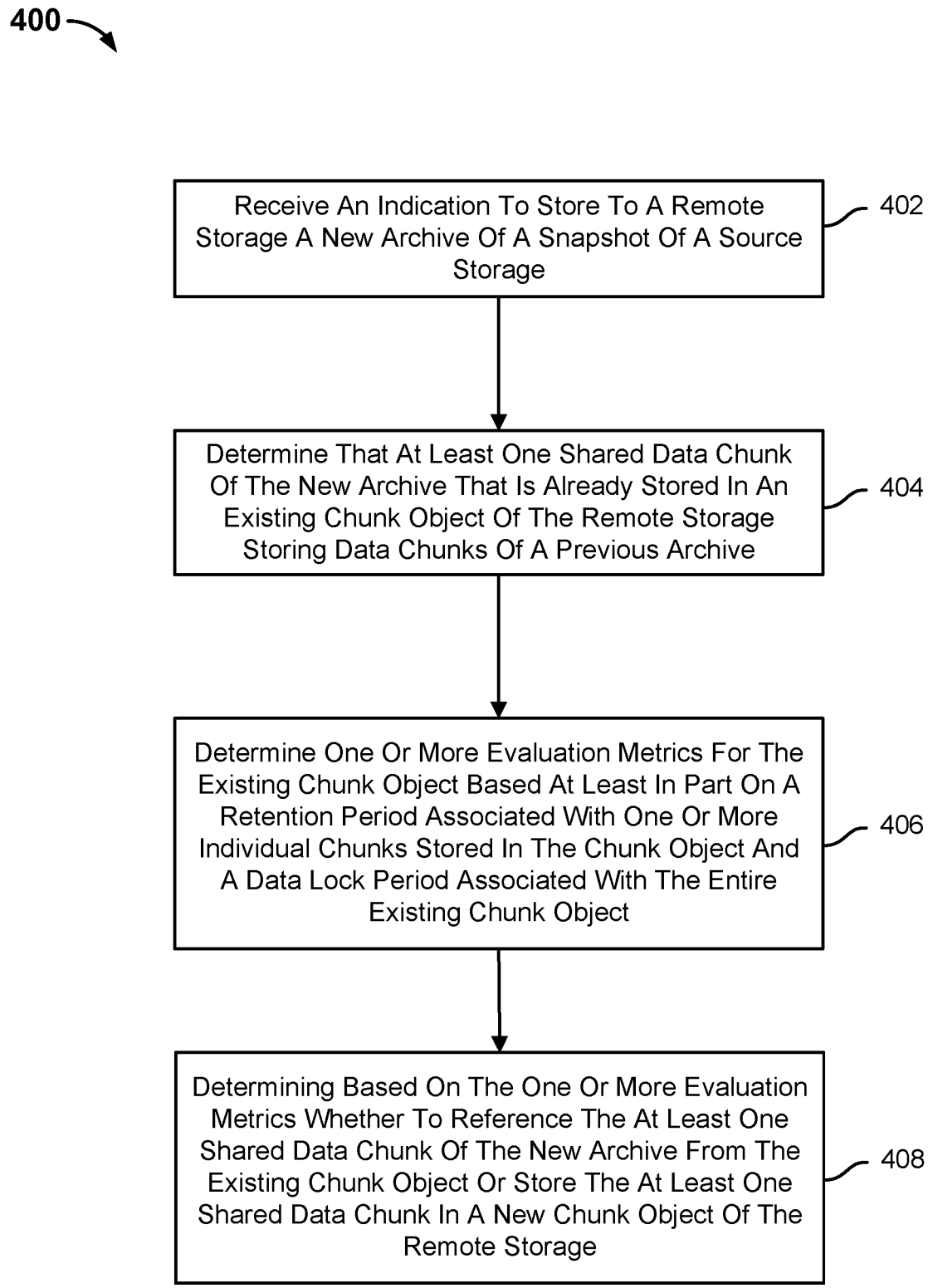
FIG. 4 is a flow diagram illustrating a process for archiving a snapshot of a source storage to a remote storage in accordance with some embodiments.

FIG. 4 is a flow diagram illustrating a process for archiving a snapshot of a source storage to a remote storage. In some embodiments, process 400 is implemented to perform some of step 204 of process 200 or step 254 of process 250. In the example shown, process 400 may be implemented by a cloud server, such as cloud server 113, or a storage system, such as storage system 105.

At 402, an indication is received to store to a remote storage a new archive of a snapshot of a source storage. The snapshot captures a state of file system data associated with the source storage at a particular point in time. In some embodiments, a specification of content to be archived in the remote storage is received from an archive manager. In some embodiments, a specification of content to be stored in the remote storage is received from a source system.

At 404, it is determined that at least one shared data chunk of the new archive is already stored in an existing chunk object of the remote storage storing data chunks of a previous archive.

A client-side component may receive a portion of the content to be archived, chunk the received portion into a plurality of data chunks, generate corresponding chunk identifiers for each of the plurality of data chunks, and provide the corresponding chunk identifiers to an archive manager. In some embodiments, the client-side component receives from the source storage corresponding chunk identifiers for data chunks that are to be archived and provides the corresponding chunk identifiers to the archive manager.

In response, the archive manager of a cloud server may compare each of the corresponding chunk identifiers to chunk identifiers included in an archive chunk metadata data structure. The archive manager may determine that at least one of the corresponding chunk identifiers corresponds to a data chunk that is already stored in an existing chunk object of the remote storage storing data chunks of a previous archive.

In some embodiments, an archive manager of a storage system receives a plurality of corresponding chunk identifiers for a plurality of data chunks. The archive manager may compare each of the corresponding chunk identifiers to chunk identifiers included in a backup chunk metadata data structure. The archive manager may determine that at least one of the corresponding chunk identifiers corresponds to a data chunk that is already stored in an existing chunk object of the remote storage storing data chunks of a previous archive.

At 406, one or more evaluation metrics for the existing chunk object are determined based at least in part on a retention period associated with one or more individual chunks stored in the existing chunk object and a data lock period associated with the entire existing chunk object.

Data chunks included in the new archive may be deduplicated against data chunks included in one or more previous archives to reduce the amount of remote storage used by an entity associated with a source storage. However, deduplicating data chunks may prevent the existing chunk object from being removed from the remote storage because the retention period associated with the existing chunk object continues to be extended as an increasing number of archived objects reference one or more data chunks included in the existing chunk object.

Each of the one or more data chunks included in the existing chunk object has a corresponding retention period because data chunks included in the existing chunk object may be referenced by different objects associated with different archives. Each of the different objects may be associated with different retention periods and/or different data lock periods.

For example, a first data chunk and a second data chunk included in a first chunk object associated with a first archive may be stored at the remote storage on 1/1/21. The first chunk object associated with the first archive may have a retention period of 60 days.

An object associated with a second archive may reference the first data chunk and an object associated with a third archive may reference the second data chunk. The object associated with the second archive may be stored at the remote storage on 2/1/21, have a retention period of 100 days, and a data lock period of 3 years. The first data chunk cannot be removed from the remote storage until at least 2/1/24.

The object associated with the third archive may be stored at the remote storage on 1/1/23, have a retention period of 30 days, and a data lock period of 7 years. The second data chunk cannot be removed from the remote storage until at least 1/1/30.

An archive manager may determine one or more evaluation metrics for the existing chunk object, such as a percentage of the data chunks of the existing chunk object that have expired and/or an amount of time before the existing chunk object can be removed from the remote storage.

In some embodiments, an evaluation metric is the used volume of a chunk object that has expired. For example, a chunk object may have a volume of 8 MB and 5 MB of data chunks included in the chunk has expired.

At 408, it is determined, based on the one or more evaluation metrics, whether to reference the at least one shared data chunk of the new archive from the existing chunk object or store the at least one shared data chunk in a new chunk object of the remote storage.

A data chunk may have expired in the event a retention period associated with the data chunk has expired, the chunk object that includes the data chunk is no longer subject to a data lock period, and/or the data chunk is no longer referenced by one or more other objects associated with one or more other archives.

At some point in time, some of the data chunks included in the existing chunk object have expired. In some embodiments, the archive manager compares the percentage of data chunks of the existing chunk object that have expired to an expiration threshold percentage. In the event the percentage of data chunks of the existing chunk object that have expired is greater than the threshold percentage, the archive manager may determine to store the at least one shared data chunk of the new archive in a new chunk object. In the event the percentage of data chunks of the existing chunk object that have expired is not greater than the expiration threshold, the archive manager may determine to generate metadata associated with the new archive that references the shared data chunk.

For example, the percentage of data chunks of the existing data chunk that have expired may be 80% and the expiration threshold percentage may be 75%. In this example, the shared data chunk would be stored in a new chunk object.

In some embodiments, the archive manager determines whether the existing chunk object is to expire within an expiration threshold period. The existing chunk object is associated with an expiration date In the event the existing chunk object is to expire within the expiration threshold period, the archive manager may determine to store the at least one shared data chunk of the new archive in a new chunk object. In the event the existing chunk object will not expire within the expiration threshold period, the archive manager may determine to generate metadata for an object included in the new archive that references the shared data chunk.

For example, the existing chunk object may expire in two months and the expiration threshold period may be one month. In this example, metadata for an object included in the new archive that references the shared data chunk would be generated.

In some embodiments, the archive manager determines whether the percentage of data chunks of the existing chunk object that have expired is greater than an expiration threshold percentage and whether the existing chunk object is to expire within an expiration threshold period. In the event the percentage of data chunks of the existing chunk object that have expired is greater than the expiration threshold percentage and the existing chunk object is to expire within the expiration threshold period, the archive manager may determine to store the at least one shared data chunk of the new archive in a new chunk object. In the event the percentage of data chunks of the existing chunk object is not greater than the expiration threshold percentage or the existing chunk object will not expire within the expiration threshold period, the archive manager may determine to generate metadata for an object included in the new archive that references the shared data chunk.

In some embodiments, the expired volume of a chunk object is compared to a volume threshold. In the event the expired volume of a chunk object is not greater than the volume threshold, then the object that includes the at least one shared data chunk of the new archive references the existing chunk object. In the event the expired volume of a chunk object is greater than the volume threshold, then the at least one shared data chunk is stored in a new chunk object of the remote storage.

Figure 5:
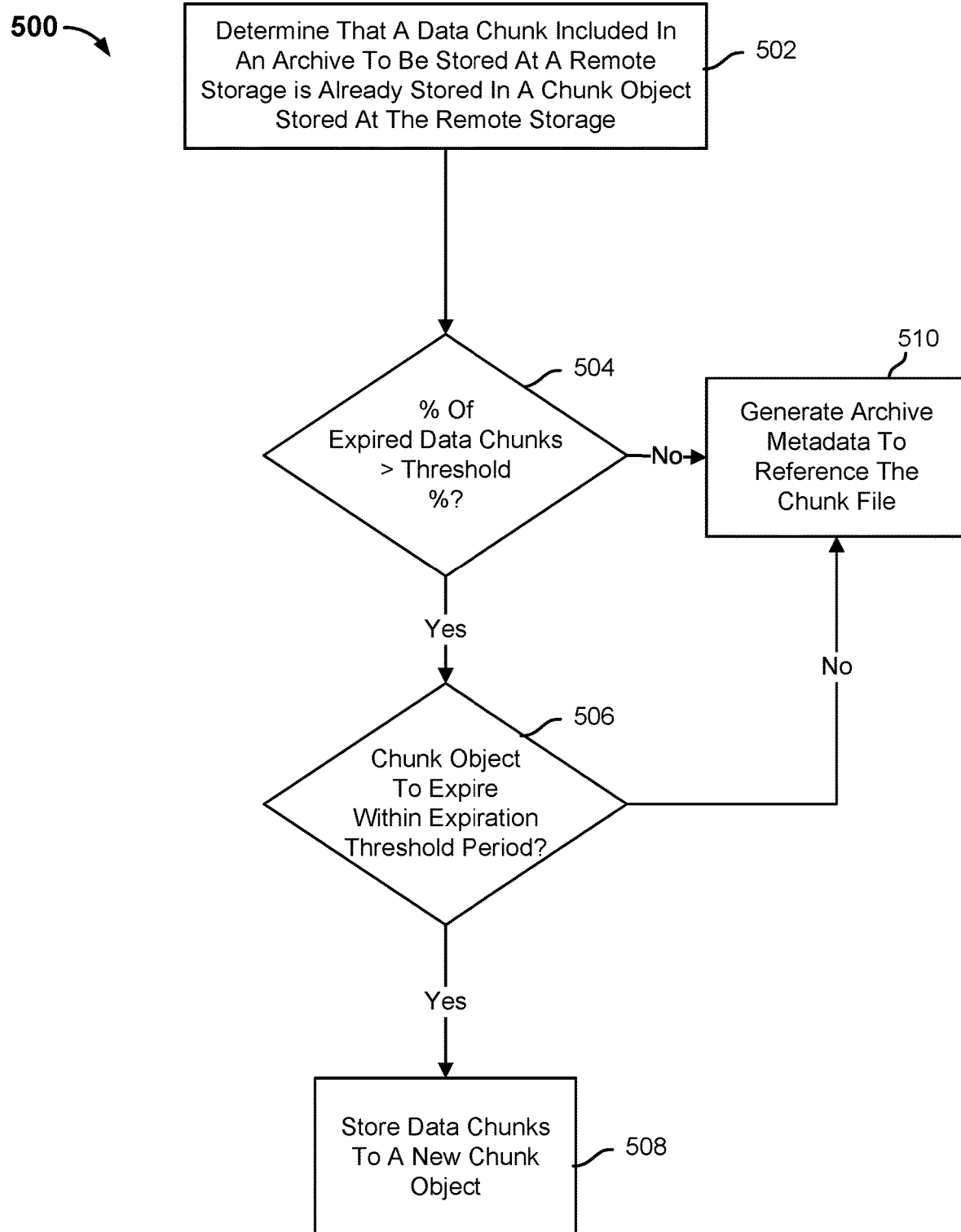
FIG. 5 is a flow diagram illustrating a process for writing a chunk object to a cloud storage in accordance with some embodiments.

FIG. 5 is a flow diagram illustrating a process for writing a chunk object to a cloud storage in accordance with some embodiments. In some embodiments, process 500 is implemented by a cloud server, such as cloud server 113, or a storage system, such as storage system 105. In the example shown, process 500 may be implemented to perform step 408 of process 400.

At 502, it is determined that a data chunk included in an archive to be stored at a remote storage is already stored in a chunk object stored at the remote storage.

At 504, it is determined whether a percentage of expired data chunks associated with the chunk object stored at the remote storage is greater than an expiration threshold percentage. In the event it is determined that a percentage of expired data chunks associated with the chunk object stored at the remote storage is greater than an expiration threshold percentage, process 500 proceeds to 506. In the event it is determined that a percentage of expired data chunks associated with the chunk object is not greater than an expiration threshold percentage, process 500 proceeds to 508. In some embodiments, step 504 is optional.

At 506, it is determined whether the chunk object will expire within an expiration threshold period. In the event it is determined that the chunk object will expire within an expiration threshold period, process 500 proceeds to 508. In the event it is determined that the chunk object will not expire within the expiration threshold period, process 500 proceeds to 510. In some embodiments, step 506 is optional.

At 508, the data chunk is stored in a new chunk object.

At 510, metadata of an archive that includes the data chunk is generated to reference the chunk object already storing the data chunk.

The file system manager generates a tree data structure that corresponds to the archive. The file system manager generates a tree data structure node that stores a reference to the chunk object storing the data chunk. In some embodiments, the reference is a chunk object identifier associated with the chunk object already storing the data chunk. In some embodiments, the reference is a chunk identifier corresponding to the data chunk.

Figure 6A:
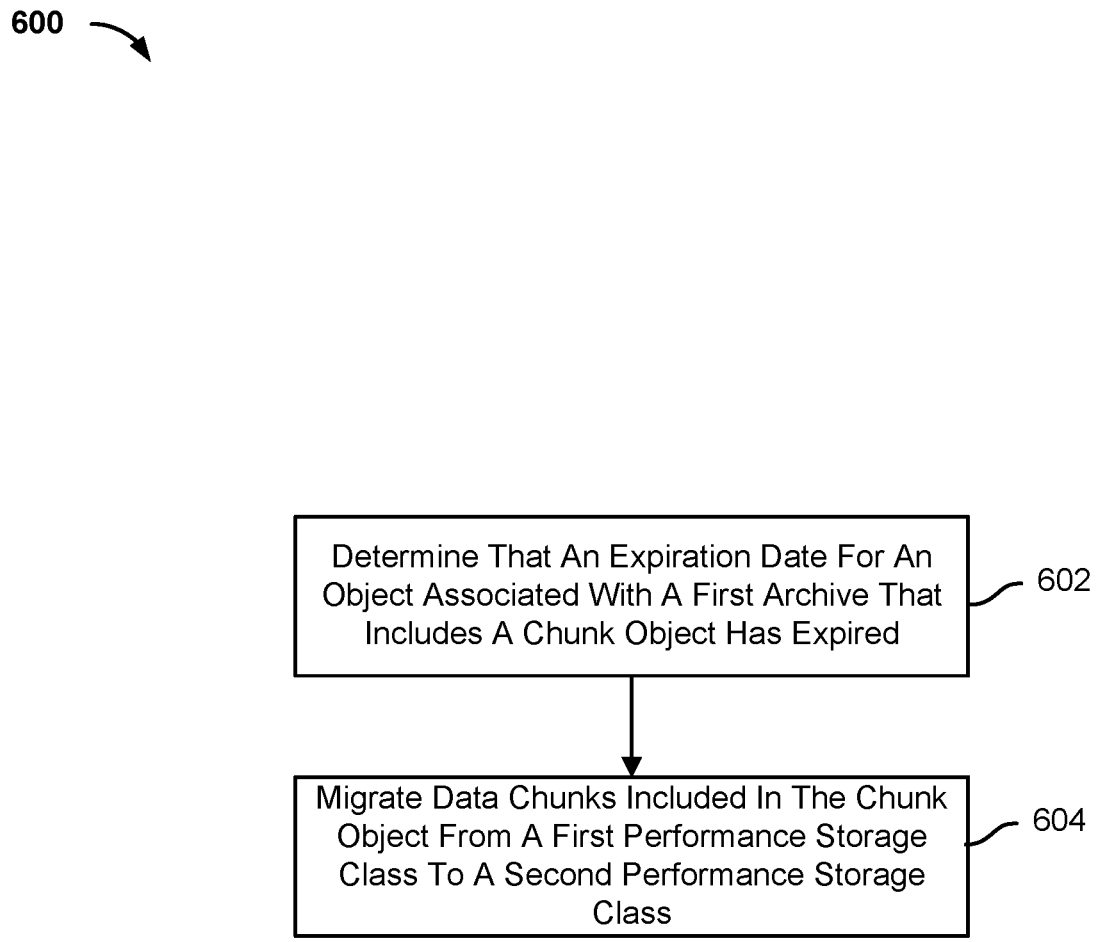
FIG. 6A is a flow diagram illustrating a process for tiering a chunk object in accordance with some embodiments.

FIG. 6A is a flow diagram illustrating a process for tiering a chunk object in accordance with some embodiments. In some embodiments, process 600 is implemented to perform some or all of step 206 of process 200. In some embodiments, process 600 is implemented by an archive manager, such as archive managers 118, 169.

There are costs associated with storing data associated with an archived object in a first performance storage class. Such costs may be reduced by migrating objects that have not been accessed or modified within a particular time period from the first performance storage class to a different performance storage class.

A user associated with a source storage may specify a tiering policy. In some embodiments, a tiering policy is specified for an archive. The archive tiering policy may indicate that the data chunks associated with the archive are to be tiered to a different performance storage class after a particular amount of time has passed (e.g., 30 days). The archive tiering policy may indicate that the data chunks associated with the archive are to be tiered to a different performance storage class in the event none of the data chunks associated with the archive have been referenced. The archive tiering policy may indicate that the data chunks associated with the archive are to be tiered to a different performance storage class in the event none of the objects associated with the archive have been accessed within a threshold period.

In some embodiments, a tiering policy is specified for an object included in an archive. The object tiering policy may indicate that the data chunks associated with the object are to be tiered to a different performance storage class after a particular amount of time has passed (e.g., 60 days). The object tiering policy may indicate that data chunks associated with the object are to be tiered to a different performance storage class in the event none of the data chunks associated with the object have been referenced. The object tiering policy may indicate that the data chunks associated with the object are to be tiered to a different performance storage class in the event the object has not been accessed within a threshold period.

In some embodiments, the tiering policy is same for a plurality of objects (e.g., all objects are to be down tiered if not accessed after six months). In some embodiments, the tiering policy is different for some or all of the objects (e.g., down tier a first object if not accessed after four months, down tier a second object if not accessed after six months).

At 602, it is determined that an expiration date for an object associated with a first archive that includes a chunk object has expired.

At 604, the data chunks included in the chunk object are migrated from a first performance storage class to a second performance storage class.

Figure 6B:
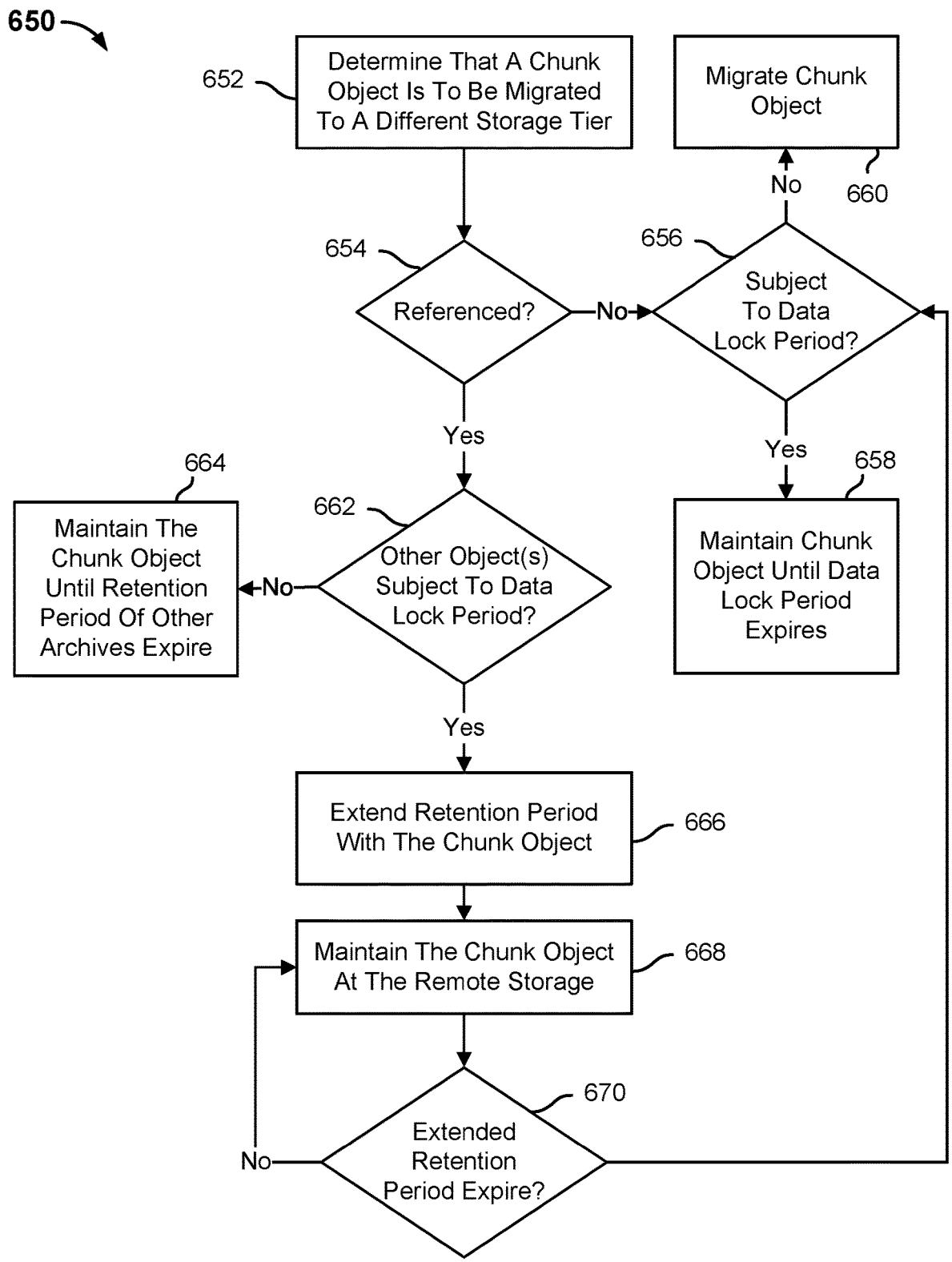
FIG. 6B is a flow diagram illustrating a process for tiering a chunk object in accordance with some embodiments.

FIG. 6B is a flow diagram illustrating a process for tiering a chunk object in accordance with some embodiments. In some embodiments, process 650 is implemented to perform some or all of step 206 of process 200. In some embodiments, process 600 is implemented by an archive manager, such as archive managers 118, 169.

At 652, it is determined that a chunk object is to be migrated from a first performance storage class to a different performance storage class.

For example, a particular amount of time may have passed or an object that includes the chunk object may not have been accessed within a threshold period.

At 654, it is determined whether one or more data chunks included in a chunk object are referenced by one or more objects associated with one or more other archives.

An archive manager may determine whether a data chunk is referenced by one or more objects associated with one or more other archives by traversing a plurality of tree data structures. Each tree data structure corresponds to a different archive. In some embodiments, a tree data structure may include a node (e.g., leaf node) that stores a chunk identifier corresponding to the data chunk. The archive manager may determine that the data chunk is referenced by one or more objects associated with one or more other archives in the event the same chunk identifier appears in one or more nodes of one or more other tree data structures.

In the event one or more data chunks included in the chunk object are not referenced by one or more objects associated with one or more other archives, process 650 proceeds to 656. In the event one or more data chunks included in the chunk object are referenced by one or more objects associated with one or more other archives, process 650 proceeds to 662.

At 656, it is determined whether the object associated with the archive that includes the chunk object is subject to a data lock period. In some embodiments, a data lock period is specified for the object that includes the chunk object. In some embodiments, a data lock period is not specified for the object that includes the chunk object. In some embodiments, a data lock period is specified for the object that includes the chunk object, but has expired.

In the event it is determined that the object associated with the archive that includes the chunk object is subject to a data lock period, process 650 proceeds to 658 where the chunk object is maintained at the remote storage until the data lock period expires. After the data lock period expires, the chunk object is migrated from the first performance storage class to the second performance storage class.

In the event it is determined that the object associated with the archive that includes the chunk object is not subject to a data lock period, process 650 proceeds to 660 where the chunk object is migrated from the first performance storage class to the second performance storage class.

At 662, it is determined whether the one or more objects that reference one or more data chunks included in the chunk object are subject to a data lock period.

In the event the one or more objects that reference one or more data chunks included in the chunk object are not subject to a data lock period, then process 650 proceeds to 664 where the chunk object is maintained in the first performance storage class until all of the retention periods of the one or more other objects expire. Afterwards, the chunk object is migrated from the first performance storage class to the second performance storage class.

In some embodiments, the retention period is the same for the one or more other objects (e.g., 30 days). In some embodiments, the retention period is different for some or all of the archives (e.g., 30 days for a first archive, 60 days for a second archive).

At 666, the retention period for the chunk object associated with the object is extended.

In some embodiments, the chunk object associated with the object is referenced by another object associated with a different archive. The other object associated with the different archive is subject to a data lock period and a retention time period. The retention time period of the chunk object associated with the object is extended to expire when the data lock period of the other object associated with the different archive expires or when the retention period for the other object associated with the different archive expires, whichever has a later expiration date.

In some embodiments, the chunk object associated with the object is referenced by a plurality of objects associated with a plurality of different archives. The retention time period of the chunk object associated with the object is extended to expire when the latest of the data lock periods of the plurality of objects associated with the plurality of different archives expire and when the latest of the retention time periods of the plurality objects associated with the plurality of different archives expires.

In some embodiments, the data lock period is the same for a plurality of objects associated with a plurality of archives (e.g., 1 year). In some embodiments, the data lock period is different for some or all of plurality of objects associated with the plurality of archives (e.g., 1 year for a first archive, 2 years for a second archive).

At 668, the chunk object is maintained at the remote storage, if necessary. In some embodiments, the retention period for the chunk object associated with the object expires when the data lock period(s) associated with the one or more objects associated with the one or more other archives expires.

At 670, it is determined whether the extended retention period has expired. In the event the extended retention period has not expired, process 650 returns to 668. In the event the extended retention period has expired, process 650 proceeds to 666.

Figure 7A:
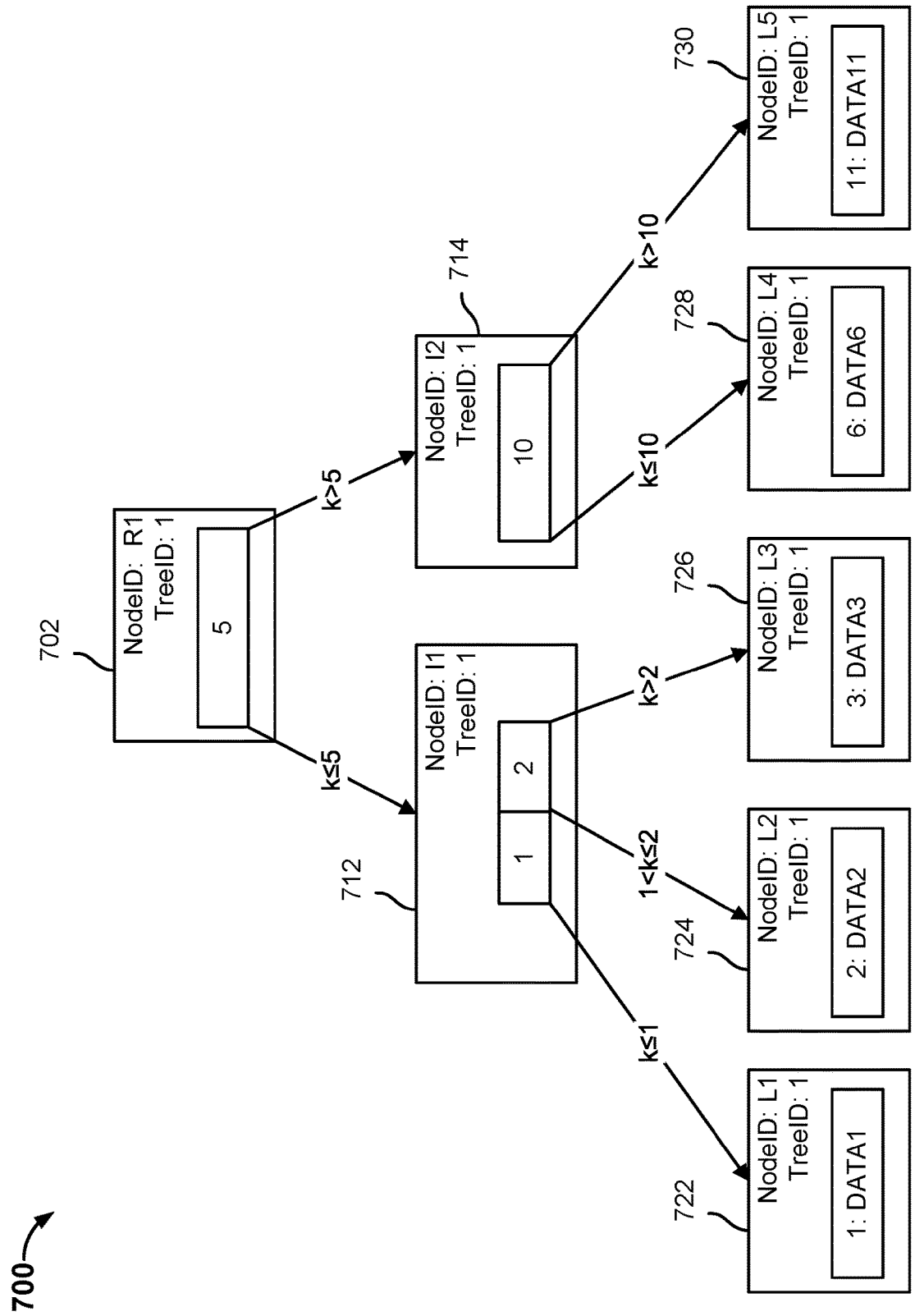
FIG. 7A is a block diagram illustrating an embodiment of a tree data structure.

FIG. 7A is a block diagram illustrating an embodiment of a tree data structure. A tree data structure may be used to represent a view of file system data that is stored on a storage system, such as storage system 105 at a particular point in time, such as time t0. The file system data may include metadata for a distributed file system and may include information, such as chunk identifier, chunk offset, file size, directory structure, file permissions, physical storage locations of the content files, etc. A file system manager, such as file system manager 115 or file system manager 167, may generate tree data structure 700 in response to ingesting a cohort of data from a source system. In some embodiments, file system manager 115 ingests a cohort of data from source system 103 via client-side component 104. In some embodiments, file system manager 167 ingests a cohort of data from source system 103.

Tree data structure 700 may represent a view of file system associated with a data management operation performed for a source system. In some embodiments, tree data structure 700 represents a view of file system data that is archived (e.g., a full archive) from a source system. In some embodiments, tree data structure 700 represents a view of file system data that is backed up from a source system (e.g., a full backup). In some embodiments, tree data structure 700 represents a view of file system data that is replicated (e.g., full replication) from a source system. In some embodiments, tree data structure 700 represents a view of file system data that is migrated (e.g., full migration) from a source system. In some embodiments, tree data structure 700 represents a view of file data that is tiered from a source system.

Tree data structure 700 is comprised of a snapshot tree that includes root node 702, intermediate nodes 712, 714, and leaf nodes 722, 724, 726, 728, 730. Although tree data structure 700 includes one intermediate level between root node 702 and leaf nodes 722, 724, 726, 728, 730, any number of intermediate levels may be implemented. The snapshot tree in conjunction with a plurality of metadata structures may provide a complete view of the source system for a particular point in time.

A root node is the starting point of a snapshot tree and include pointers to one or more other nodes. An intermediate node is a node to which another node points (e.g., root node, other intermediate node) and includes one or more pointers to one or more other nodes. A leaf node is a node of the snapshot tree that does not have child nodes of the snapshot tree. Each node of the tree structure includes a view identifier of a view with which the node is associated (e.g., Tree ID).

A leaf node may be configured to store key-value pairs of file system data. A data key k is a lookup value by which a particular leaf node may be accessed. For example, "1" is a data key that may be used to lookup "DATA1" of leaf node 722. The data key k may correspond to a brick number of a data brick. A data brick may be associated with one or more data chunks. In some embodiments, the leaf node is configured to store file system metadata (e.g., chunk identifier (e.g., hash value, SHA-1, etc.), file size, directory structure, file permissions, physical storage locations of the content files, etc.). A leaf node may store a data key k and a pointer to a location that stores the value associated with the data key. In some embodiments, a leaf node is configured to store the data associated with an object when the data is less than or equal to a limit size (e.g., 256 kB). In some embodiments, a leaf node includes a pointer to a metadata structure (e.g., blob structure) when the size of data associated with an object is larger than the limit size.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 702 may include a node key of "5." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 702 would be traversed to intermediate node 712 because the data keys of "1," "2," and "3" are less than or equal to the node key "5." To find a leaf node storing a value associated with a data key of "6" or "11," the second branch of root node 702 would be traversed to intermediate node 714 because data keys "6" and "11" are greater than the node key of "5."

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "5." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key and may be used to determine which branch of a node is associated with a non-numerical data key. For example, a hash function may be applied to a non-numerical data key, resulting in a corresponding hash value; the hash value may be used to select which branch of a node is associated with the corresponding non-numerical data key. Accordingly, it can be determined that a first bucket is associated with a first branch of a node and a second bucket is associated with a second branch of the node.

In the example shown, root node 702 includes pointers to intermediate node 712 and intermediate node 714. Root node 702 includes a Node ID of "R1" and a Tree ID of "1." The Node ID identifies the name of the node. The Tree ID identifies the view with which the node is associated. When a change is made to data stored in a leaf node as described with respect to FIGS. 7B, 7C, and 7D, the Tree ID is used to determine whether a copy of a node is to be made.

Root node 702 includes a node key that divides a set of pointers into two different subsets. Leaf nodes (e.g., "1-3") with a data key k that is less than or equal to the node key are associated with a first branch and leaf nodes (e.g., "6, 11") with a data key k that is greater than the node key are associated with a second branch. Leaf nodes with a data key of "1," "2," or "3" may be found by traversing tree data structure 700 from root node 702 to intermediate node 712 because the data keys have a value that is less than or equal to the node key. Leaf nodes with a data key of "6" or "11" may be found by traversing tree data structure 700 from root node 702 to intermediate node 714 because the data keys have a value that is greater than the node key.

Root node 702 includes a first set of pointers. The first set of pointers associated with a data key less than the node key (e.g., "1", "2," or "3") indicates that traversing tree data structure 700 from root node 702 to intermediate node 712 will lead to a leaf node with a data key of "1," "2," or "3." Intermediate node 714 includes a second set of pointers. The second set of pointers associated with a data key greater than the node key indicates that traversing tree data structure 700 from root node 702 to intermediate node 714 will lead to a leaf node with a data key of "6" or "11."

Intermediate node 712 includes pointers to leaf nodes 722, 724, 726. Intermediate node 712 includes a Node ID of "I1" and a Tree ID of "1." Intermediate node 712 includes a first node key of "1" and a second node key of "2." The data key k for leaf node 722 is a value that is less than or equal to the first node key. The data key k for leaf node 724 is a value that is greater than the first node key and less than or equal to the second node key. The data key k for leaf node 726 is a value that is greater than the second node key. The pointer to leaf node 722 indicates that traversing tree data structure 700 from intermediate node 712 to leaf node 722 will lead to the node with a data key of "1." The pointer to leaf node 724 indicates that traversing tree data structure 700 from intermediate node 712 to leaf node 724 will lead to the node with a data key of "2." The pointer to leaf node 726 indicates that traversing tree data structure 700 from intermediate node 712 to leaf node 726 will lead to the node with a data key of "3."

Intermediate node 714 includes pointers to leaf nodes 728, 730. Intermediate node 714 includes a Node ID of "I2" and a Tree ID of "1." Intermediate node 714 includes a node key of "10." The data key k for leaf node 728 is a value that is less than or equal to the node key. The data key k for leaf node 730 is a value that is greater than the node key. The pointer to leaf node 728 indicates that traversing tree data structure 700 from intermediate node 714 to leaf node 728 will lead to the node with a data key of "6." The pointer to leaf node 730 indicates that traversing tree data structure 700 from intermediate node 714 to leaf node 730 will lead to the node with a data key of "11."

Leaf nodes 722, 724, 726, 728, 730 include respective data key-value pairs of "1: DATA1," "2: DATA2," "3: DATA3," "6: DATA6," "11: DATA11." Leaf nodes 722, 724, 726, 728, 730 include respective Node IDs of "L1," "L2," "L3," "L4," "L5." Leaf nodes 722, 724, 726, 728, 730 all include a Tree ID of "1." In some embodiments, leaf nodes 722, 724, 726, 728, or 730 are configured to store metadata. In other embodiments, leaf nodes 722, 724, 726, 728, or 730 are configured to store content data when the size of the object is less than or equal to a limit size. In other embodiments, leaf nodes 722, 724, 726, 728, or 730 are inodes and are configured to store a pointer to or an identifier of a respective object metadata structure (e.g., object metadata tree).

Figure 7B:
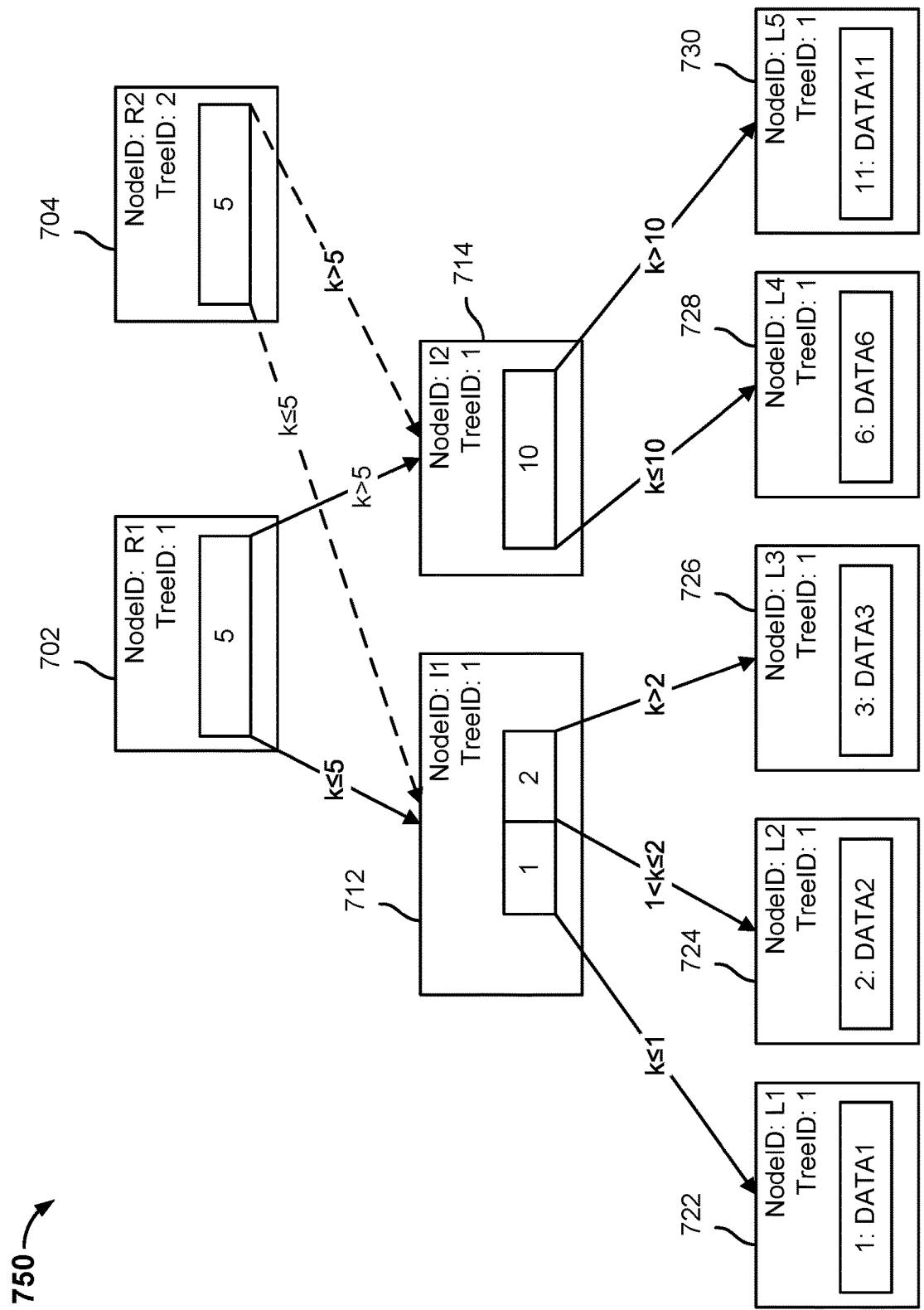
FIG. 7B is a block diagram illustrating an embodiment of a cloned tree data structure.

FIG. 7B is a block diagram illustrating an embodiment of a cloned tree data structure. A snapshot tree may be cloned and added to a tree data structure when a subsequent data management operation is performed. For example, a data management operation may include an incremental archive of a source system, an incremental backup or a source system, a migration of backed up data, a restoration of backed up data, a replication of backed up data, etc. In some embodiments, tree data structure 750 is created by a file system manager, such as file system manager 115 or file system manager 167.

In the example shown, tree data structure 750 includes root nodes 702, 704, intermediate nodes 712, 714, and leaf nodes 722, 724, 726, 728, and 730. Tree data structure 750 can be used to capture different versions of file system data at different moments in time. A tree data structure may also efficiently locate desired metadata by traversing a particular version of a snapshot tree included in the tree data structure. In some embodiments, the tree data structure allows a chain of snapshot trees to be linked together by allowing a node of a later version of a snapshot tree to reference a node of a previous version of a snapshot tree. This may correspond to a scenario where a full archive or a full backup of a source system is performed and then subsequently a plurality of incremental archives or incremental backups of the source system is performed.

In the example shown, a snapshot tree with root node 704 is linked to a snapshot tree with root node 702. In some embodiments, each time a data management operation is performed, a new root node is created and the new root node includes the same set of pointers included in the previous root node, that is the new root node of the snapshot tree may be linked to one or more intermediate nodes associated with a previous snapshot tree. The new root node also includes a different Node ID and a different Tree ID. In some embodiments, each time a data management operation is completed, a new root node is created and the new root node includes the same set of pointers included in the previous root node.

In some embodiments, a root node is associated with a current view of the file system data. A current view may still accept one or more changes to the data. In the example shown, root node 704 is associated with a current view of the file system data. In other embodiments, a root node is associated with a snapshot view of the file system data. A snapshot view may represent a state of the file system data at a particular moment in time in the past and is not updated. In the example shown, root node 702 is associated with a snapshot view of the file system data.

To generate a snapshot tree corresponding to an incremental data management operation at ti, root node 702 is cloned, i.e., copied. In the example shown, root node 704 is a copy of root node 702. Similar to root node 702, root node 704 includes the same pointers as root node 702, but includes a different Node ID and a different Tree ID. Root node 704 includes a first set of pointers to intermediate node 712. The first set of pointers associated with a data key k less than or equal to the node key (e.g., "1," "2," or "3") indicates that traversing tree data structure 750 from root node 704 to intermediate node 712 will lead to a leaf node with a data key of "1," "2," or "3." Root node 704 includes a second set of pointers to intermediate node 714. The second set of pointers associated with a data key k greater than the node key indicates that traversing tree data structure 750 from root node 704 to intermediate node 714 will lead to a leaf node with a data key of "6" or "11." Root node 704 includes a Node ID of "R2" and a Tree ID of "2."

Figure 7C:
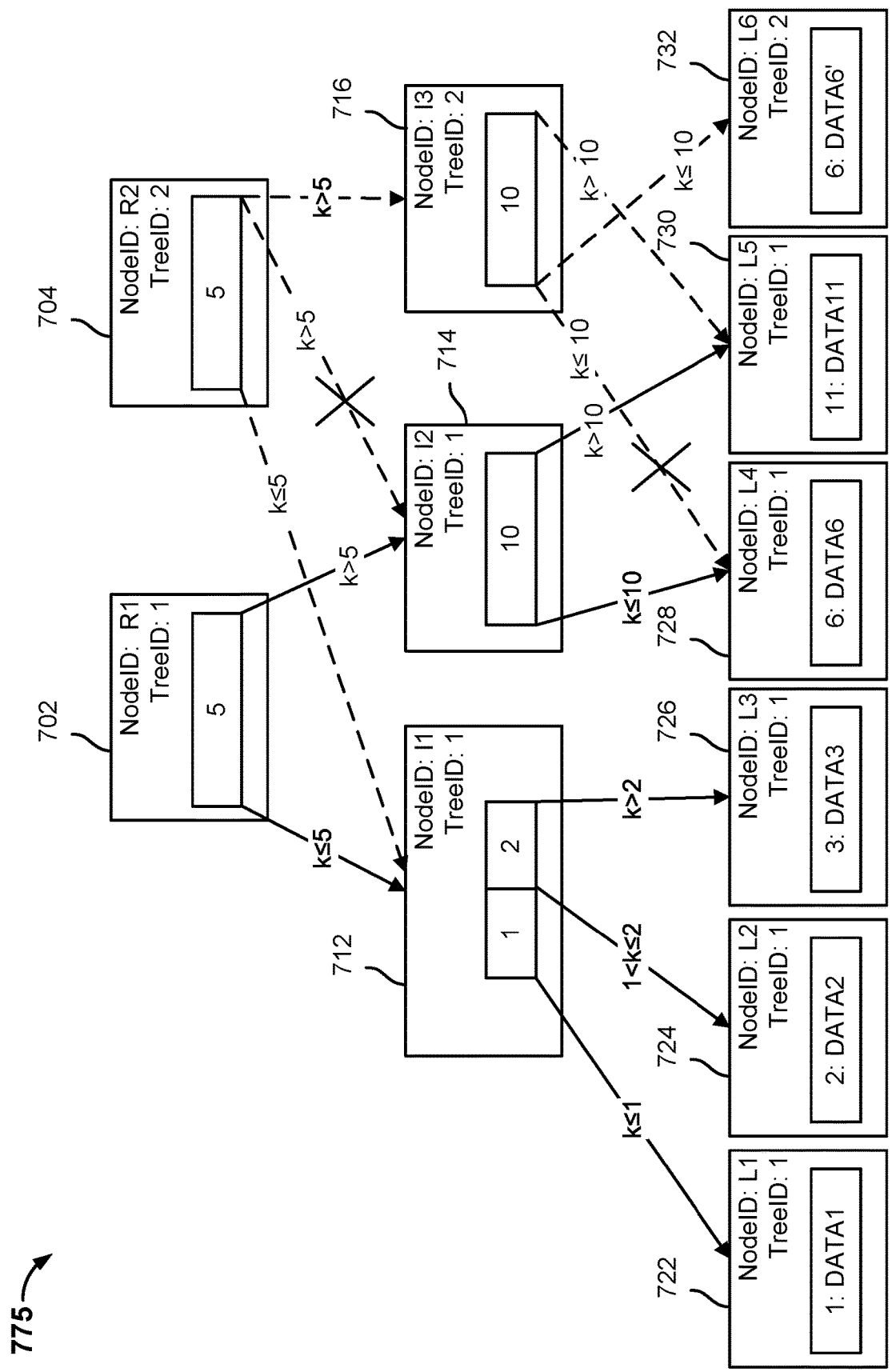
FIG. 7C is a block diagram illustrating an embodiment of modifying a cloned tree data structure.

FIG. 7C is a block diagram illustrating an embodiment of modifying a cloned tree data structure. In the example shown, tree data structure 775 may be modified by a file system manager, such as file system manager 115 or file system manager 167. A snapshot tree with a root node 704 may be a current view of the file system data, for example, at time ti.

In the example shown, the value "DATA6" has been modified to be "DATA6'." In some embodiments, the value of a key value pair has been modified. In other embodiments, the value of the key value pair is the file data of associated with a content file that is smaller than or equal to a limit size. In other embodiments, the value of the key value pair points to a different metadata structure (e.g., a metadata structure corresponding to a different version of a file). The different metadata structure may be a modified version of the metadata structure to which the leaf node previously pointed.

To modify the snapshot tree at ti, the file system manager starts at root node 704 because that is the root node associated with the snapshot tree at time ti. The value "DATA6" is associated with the data key "6." The file system manager traverses tree data structure 775 from root node 704 until it reaches a target node, in this example, leaf node 728. The file system manager compares the Tree ID at each intermediate node and leaf node with the Tree ID of the root node. In the event the Tree ID of a node matches the Tree ID of the root node, the file system manager proceeds to the next node. In the event the Tree ID of a node does not match the Tree ID of the root node, a shadow copy of the node with the non-matching Tree ID is made. A shadow copy is a copy of a node and includes the same pointers as the copied node, but includes a different Node ID and Tree ID. For example, to reach a leaf node with a data key of "6," the file system manager begins at root node 704 and proceeds to intermediate node 714. The file system manager compares the Tree ID of intermediate node 714 with the Tree ID of root node 704, determines that the Tree ID of intermediate node 714 does not match the Tree ID of root node 704, and creates a copy of intermediate node 714. The intermediate node copy 716 includes the same set of pointers as intermediate node 714, but includes a Tree ID of "2" to match the Tree ID of root node 704. The file system manager updates a pointer of root node 704 to point to intermediate node 716 instead of pointing to intermediate node 714. The file system manager traverses tree data structure 775 from intermediate node 716 to leaf node 728, determines that the Tree ID of leaf node 728 does not match the Tree ID of root node 704, and creates a copy of leaf node 728. Leaf node copy 732 stores the modified value "DATA6'" and includes the same Tree ID as root node 704. The file system manager updates a pointer of intermediate node 716 to point to leaf node 732 instead of pointing to leaf node 728. In some embodiments, leaf node 732 stores the value of a key value pair that has been modified. In other embodiments, leaf node 732 stores the modified data associated with a content file that is smaller than or equal to a limit size.

Figure 7D:
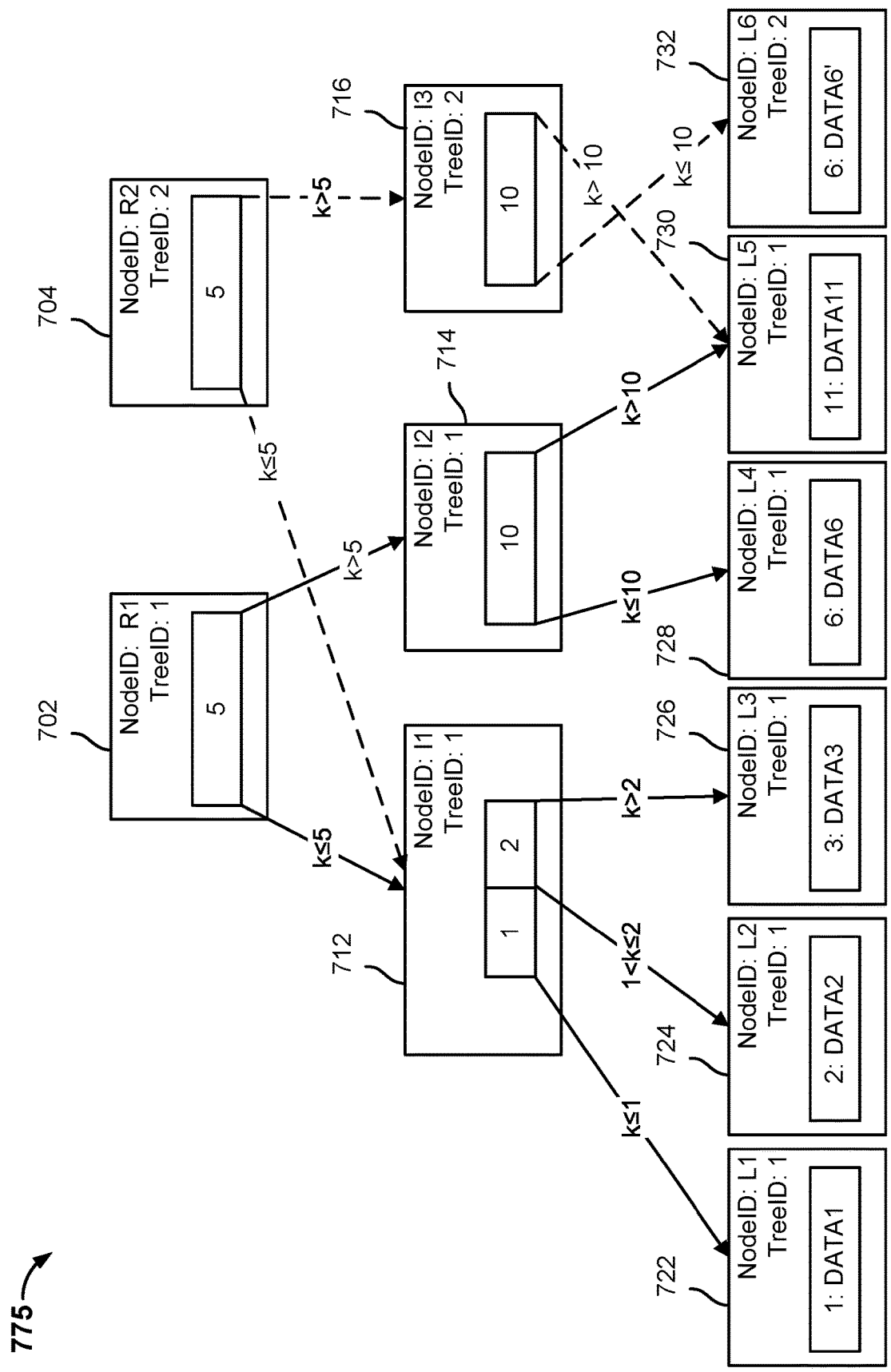
FIG. 7D is a block diagram illustrating an embodiment of a modified tree data structure.

FIG. 7D is a block diagram illustrating an embodiment of a modified tree data structure. Tree data structure 775 shown in FIG. 7D illustrates a result of the modifications made to a snapshot tree as described with respect to FIG. 7C.

Figure 8A:
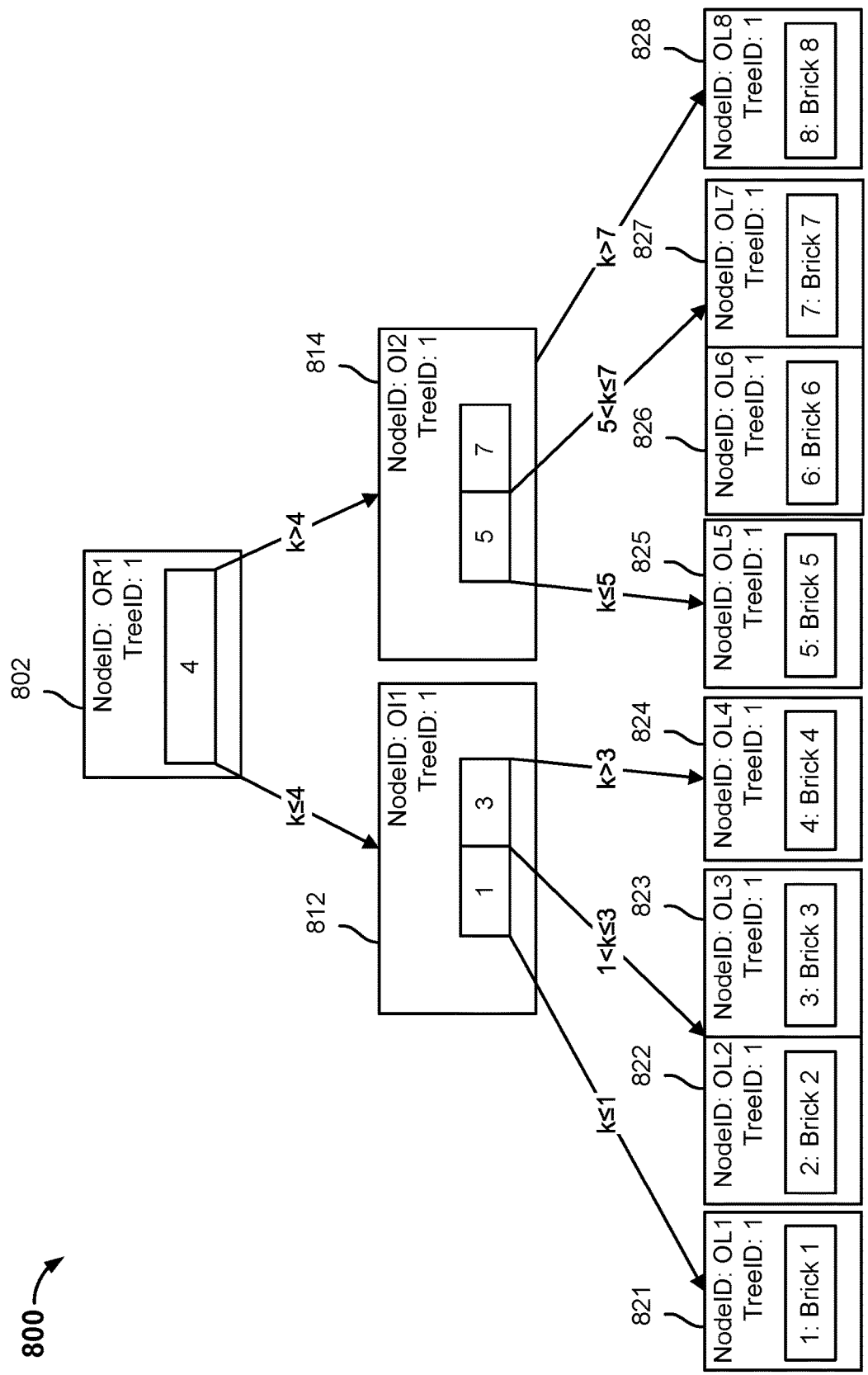
FIG. 8A is a block diagram illustrating an embodiment of a tree data structure.

FIG. 8A is a block diagram illustrating an embodiment of a tree data structure. In some embodiments, tree data structure 800 is created by a file system manager, such as file system manager 115 or file system manager 167. Tree data structure 800 may be used to organize the metadata and data content associated with an object, an object file, or a content file. Tree data structure may be referred to as a metadata structure, an object file metadata structure, or a file metadata structure. In the example shown, tree data structure 800 corresponds to the contents of an object file.

A leaf node of a snapshot tree associated with file system data, such as a leaf node of tree data structures 700, 750, 775, may include a pointer to a tree data structure that stores metadata corresponding to an object file, such as tree data structure 800. A tree data structure corresponding to an object file and storing the file metadata associated with the object file is a snapshot tree, but is used to organize the data chunks associated with the object file (e.g., data components) that are stored on the storage system.

A tree data structure corresponding to an object file at a particular point in time (e.g., a particular version) may be comprised of a root node, one or more levels of one or more intermediate nodes, and one or more leaf nodes. In some embodiments, a tree data structure corresponding to an object file is comprised of a root node and one or more leaf nodes without any intermediate nodes. Tree data structure 800 may be a snapshot of an object file at a particular point in time t, for example at time to. In some embodiments, tree data structure 800 corresponds to a full archive of an object file. In some embodiments, tree data structure 800 corresponds to a full backup of the object file.

In the example shown, tree data structure 800 includes object root node 802, object intermediate nodes 812, 814, and object leaf nodes 821, 822, 823, 824, 825, 826, 827, 828. Similar to the snapshot trees described above, each node includes a "Node ID" that identifies the node and a "Tree ID" that identifies a view with which the node is associated (e.g., a version of the content file). Root node 802 includes pointers to intermediate nodes 812, 814. Root node 802 includes a Node ID of "OR1" and a Tree ID of "1."

In the example shown, intermediate node 812 includes respective pointers to leaf nodes 821, 822, 823, 824. Intermediate node 812 includes a Node ID of "OI1" and a Tree ID of "1." Intermediate node 812 includes a first node key and a second node key. The data key k for leaf node 821 is a value that is less than or equal to the first node key. The data key for leaf nodes 822, 823 is a value that is greater than the first node key and less than or equal to the second node key. The data key for leaf node 824 is a value that is greater than the second node key. The pointer to leaf node 821 indicates that traversing tree data structure 300 from intermediate node 812 to leaf node 821 will lead to the node with a data key of "1." The pointer to leaf node 822 indicates that traversing tree data structure 800 from intermediate node 812 to leaf node 822 will lead to the node with a data key of "2." The pointer to leaf node 823 indicates that traversing tree data structure 800 from intermediate node 812 to leaf node 823 will lead to the node with a data key of "3." The pointer to leaf node 824 indicates that traversing tree data structure 300 from intermediate node 812 to leaf node 824 will lead to the node with a data key of "4."

In the example shown, intermediate node 814 includes respective pointers to leaf nodes 825, 826, 827, 828. Intermediate node 814 includes a Node ID of "OI2" and a Tree ID of "1." Intermediate node 814 includes a first node key and a second node key.

The data key k for leaf node 825 is a value that is less than or equal to the first node key. The data key for leaf nodes 826, 827 is a value that is greater than the first node key and less than or equal to the second node key. The data key for leaf node 828 is a value that is greater than the second node key. The pointer to leaf node 825 indicates that traversing tree data structure 300 from intermediate node 814 to leaf node 825 will lead to the node with a data key of "5." The pointer to leaf node 826 indicates that traversing tree data structure 300 from intermediate node 814 to leaf node 826 will lead to the node with a data key of "6." The pointer to leaf node 827 indicates that traversing tree data structure 800 from intermediate node 814 to leaf node 827 will lead to the node with a data key of "7." The pointer to leaf node 828 indicates that traversing tree data structure 800 from intermediate node 814 to leaf node 828 will lead to the node with a data key of "8."

Leaf node 821 includes a data key-value pair of "1: Brick 1." "Brick 1" is a brick identifier that identifies the data brick associated with one or more data chunks of a content file corresponding to tree data structure 800. Leaf node 821 includes a Node ID of "OL1" and a Tree ID of "1."

Leaf node 822 includes a data key-value pair of "2: Brick 2." "Brick 2" is a brick identifier that identifies the data brick associated with one or more data chunks of a content file corresponding to tree data structure 800. Leaf node 822 includes a Node ID of "OL2" and a Tree ID of "1." In this example, both leaf nodes 822, 823 have a key value that is less than or equal to 3 and greater than 1. A file system manager may traverse to leaf node 822 or leaf node 823 based on the corresponding key associated with leaf node 822 and leaf node 823. For example, the file system manager may receive a request to return the value associated with a data key "2." In response to the request, the file system manager may traverse tree data structure 800 to leaf node 822. A file system manager may receive a request to return the value associated with a data key "3." In response to the request, the file system manager may traverse tree data structure 800 to leaf node 823.

Leaf node 823 includes a data key-value pair of "3: Brick 3." "Brick 3" is a brick identifier that identifies the data brick associated with one or more data chunks of an object file corresponding to tree data structure 800. Leaf node 823 includes a Node ID of "OL3" and a Tree ID of "1."

Leaf node 824 includes a data key-value pair of "4: Brick 4." "Brick 4" is a brick identifier that identifies the data brick associated with one or more data chunks of an object file corresponding to tree data structure 800. Leaf node 824 includes a Node ID of "OL4" and a Tree ID of "1."

Leaf node 825 includes a data key-value pair of "5: Brick 5." "Brick 5" is a brick identifier that identifies the data brick associated with one or more data chunks of an object file corresponding to tree data structure 800. Leaf node 825 includes a Node ID of "OL5" and a Tree ID of "1."

Leaf node 826 includes a data key-value pair of "6: Brick 6." "Brick 6" is a brick identifier that identifies the data brick associated with one or more data chunks of an object file corresponding to tree data structure 800. Leaf node 826 includes a Node ID of "OL6" and a Tree ID of "1." In this example, both leaf nodes 826, 827 have a key value that is less than or equal to 7 and greater than 5. A file system manager may traverse tree data structure 800 to leaf node 826 or leaf node 827 based on the corresponding key associated with leaf node 826 and leaf node 827. For example, the file system manager may receive a request to return the value associated with a data key "6." In response to the request, the file system manager may traverse tree data structure 800 to leaf node 826. The file system manager may receive a request to return the value associated with a data key "7." In response to the request, the file system manager may traverse tree data structure 800 to leaf node 827.

Leaf node 827 includes a data key-value pair of "7: Brick 7." "Brick 7" is a brick identifier that identifies the data brick associated with one or more data chunks of a content file corresponding to tree data structure 800. Leaf node 827 includes a Node ID of "OL7" and a Tree ID of "1."

Leaf node 828 includes a data key-value pair of "8: Brick 8." "Brick 8" is a brick identifier that identifies the data brick associated with one or more data chunks of a content file corresponding to tree data structure 800. Leaf node 828 includes a Node ID of "OL8" and a Tree ID of "1."

An object file may be comprised of one or more chunk files. A chunk file is comprised of a plurality of data chunks. A brick may be associated with one or more data chunks. In the example shown, leaf nodes 821, 822, 823, 824, 825, 826, 827, 828 each store a corresponding brick identifier. For each of the one or more data chunks associated with a data brick, the data brick stores information that associates an object offset for the data chunk with an extent for the data chunk and a chunk file identifier storing the data chunk.

In some embodiments, data chunks associated with an object file are stored in one or more chunk objects stored in cloud storage. Instead of storing information that associates a data brick with a chunk file, the data brick stores information that associates one or more data chunks with one or more chunk objects.

Figure 8B:
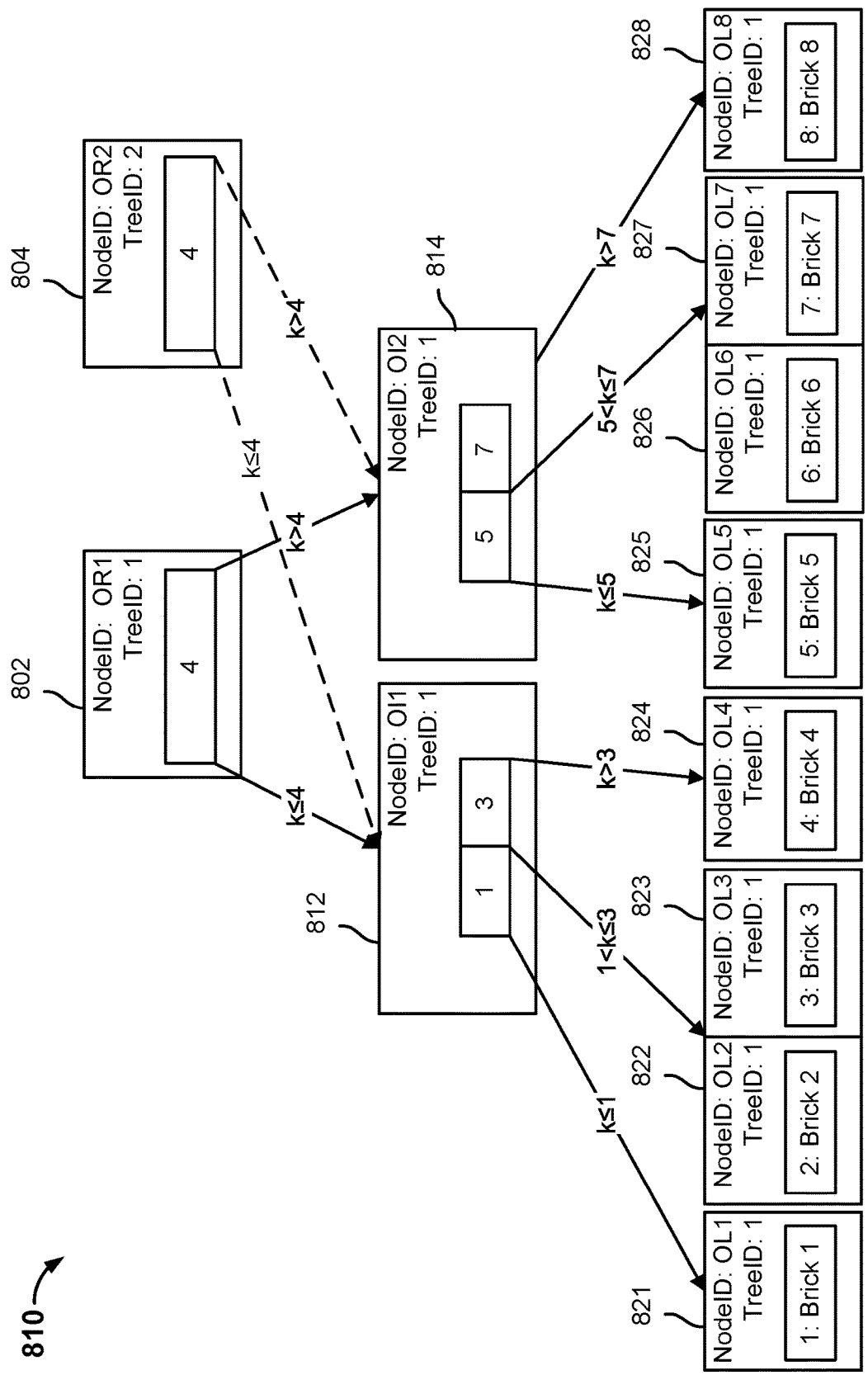
FIG. 8B is a block diagram illustrating an embodiment of a cloned tree data structure.

FIG. 8B is a block diagram illustrating an embodiment of a cloned tree data structure. A metadata structure may be cloned when an incremental data management operation is performed, such as when an incremental backup or an incremental archive of an object is performed. In some embodiments, tree data structure 810 is created by a file system manager, such as file system manager 115 or file system manager 167.

In the example shown, tree data structure 810 corresponds to an object file, but stores metadata associated with the object file. The tree data structure can be used to capture different versions of an object, an object file, or a content file at different moments in time. The metadata structure corresponding to a subsequent version of an object, an object file, a content file may be generated in part by cloning the metadata structure corresponding to a previous version of an object, an object file, or a content file.

A root node or an intermediate node of a version of a metadata structure may reference an intermediate node or a leaf node of a previous version of a metadata structure. Similar to the snapshot tree, the metadata structure allows different versions of an object, an object file, or a content file to share nodes and allows changes to be tracked. When a cohort of data associated with a data management operation is received, a root node of the metadata structure may be linked to one or more intermediate nodes associated with a previous metadata structure. This may occur when data associated with an object, an object file, or a content file is included in a plurality of data management operations.

In the example shown, tree data structure 810 includes a first metadata structure comprising root node 802, intermediate nodes 812, 814, and leaf nodes 821, 822, 823, 824, 825, 826, 827, 828. Tree data structure 810 also includes a second metadata structure that may be a snapshot of object data at a particular point in time, for example at time ti. The second metadata structure is comprised of root node 804, intermediate nodes 812, 814, and leaf nodes 821, 822, 823, 824, 825, 826, 827, 828. To create a snapshot of the object data at time ti, a new root node is created by cloning the previous root node. The cloned root node includes the same set of pointers as the previous root node, but includes a different Node ID and a different Tree ID. In the example shown, root node 804 includes a set of pointers to intermediate nodes 812, 814, which are intermediate nodes associated with a previous snapshot. The Tree ID is the view identifier associated with a view of the metadata structure at a particular moment in time. The Tree ID of a root node indicates a view with which the root node is associated (e.g., content file version). For example, root node 802 with a Tree ID of "1" is associated with a first backup snapshot and root node 804 with a Tree ID of "2" is associated with a second backup snapshot.

In the example shown, root node 804 is a clone (i.e., a copy) of root node 802. Similar to root node 802, root node 804 includes the same pointers as root node 802. Root node 804 includes a first set of pointers to intermediate node 812. The first set of pointers associated with a data key (e.g., "1," "2," "3," or "4") less than or equal to the node key indicates that traversing a metadata structure included in tree data structure 810 from root node 804 to intermediate node 812 leads to a leaf node with a data key of "1," "2," "3," or "4." Root node 804 includes a second set of pointers to intermediate node 814. The second set of pointers associated with a data key greater than the node key indicates that traversing a metadata structure included in tree data structure 810 from root node 804 to intermediate node 814 leads to a leaf node with a data key of "5," "6," "7," or "8." Root node 804 includes a Node ID of "OR2" and a Tree ID of "2."

Figure 8C:
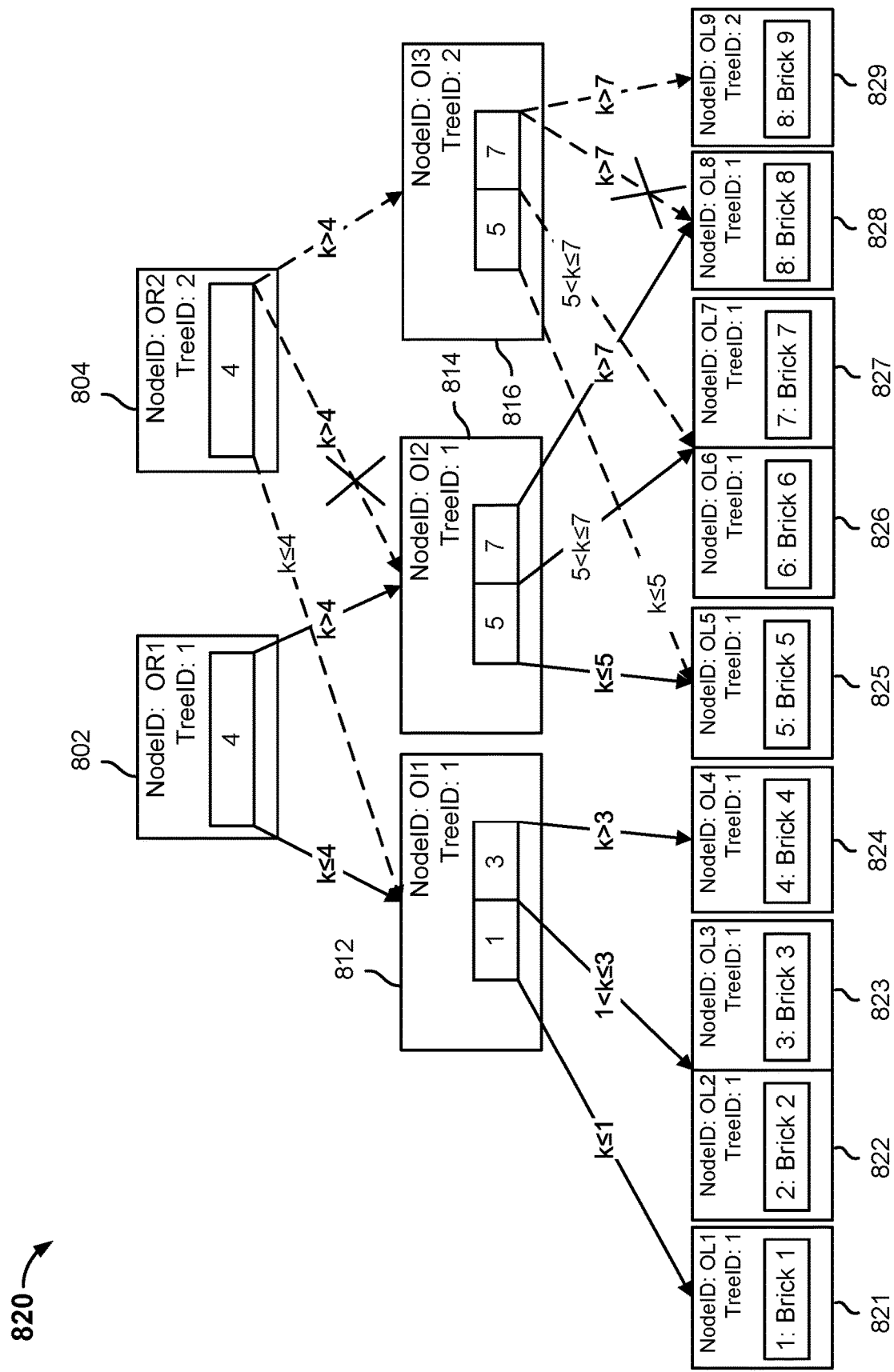
FIG. 8C is a block diagram illustrating an embodiment of modifying a cloned tree data structure.

FIG. 8C is a block diagram illustrating an embodiment of modifying a cloned tree data structure. Tree data structure 820 is comprised of a first metadata structure that includes root node 802 and a second metadata structure that includes root node 804. In the example shown, tree data structure 820 may be modified by a file system manager, such as file system manager 115 or file system manager 167.

In some embodiments, the content data associated with an object file may be modified such that one of the data chunks is replaced by another data chunk. When a data chunk of content data associated with a previous data management operation is replaced with a new data chunk, the data brick associated with the new data chunk may be different. To represent this modification to the object data, a corresponding modification is made to a current view of a metadata structure. The data chunk of the content data that was replaced has a corresponding leaf node in the previous metadata structure. A new leaf node in the current view of the metadata structure is created, as described herein, that corresponds to the new data chunk. The new leaf node includes an identifier associated with the current view. The new leaf node may also store the chunk identifier associated with the modified data chunk.

In the example shown, a data chunk associated with "Brick 8" has been modified. The data chunk associated with "Brick 8" has been replaced with a data chunk associated with "Brick 9." At ti, the file system manager starts at root node 804 because that is the root node associated with the metadata structure at time ti. The value "Brick 8" is associated with the data key "8." The file system manager traverses tree data structure 820 from root node 804 until it reaches a target node, in this example, leaf node 828. The file system manager compares the Tree ID at each intermediate node and leaf node with the Tree ID of the root node. In the event the Tree ID of a node matches the Tree ID of the root node, the file system manager proceeds to the next node. In the event the Tree ID of a node does not match the Tree ID of the root node, a shadow copy of the node with the non-matching Tree ID is made. A shadow copy is a copy of a node and includes the same pointers as the copied node but includes a different Node ID and Tree ID. For example, to reach a leaf node with a data key of "8," the file system manager begins at root node 804 and proceeds to intermediate node 814. The file system manager compares the Tree ID of intermediate node 814 with the Tree ID of root node 804, determines that the Tree ID of intermediate node 814 does not match the Tree ID of root node 804, and creates a copy of intermediate node 814. The intermediate node copy 816 includes the same set of pointers as intermediate node 814 but includes a Tree ID of "2" to match the Tree ID of root node 804. The file system manager updates a pointer of root node 804 to point to intermediate node 816 instead of pointing to intermediate node 814. The file system manager traverses tree data structure 820 from intermediate node 816 to leaf node 828, determines that the Tree ID of leaf node 828 does not match the Tree ID of root node 804, and creates a copy of leaf node 828. Leaf node 829 is a copy of leaf node 828, but stores the brick identifier "Brick 8'" and includes the same Tree ID as root node 804. The file system manager updates a pointer of intermediate node 816 to point to leaf node 829 instead of pointing to leaf node 828.

Figure 8D:
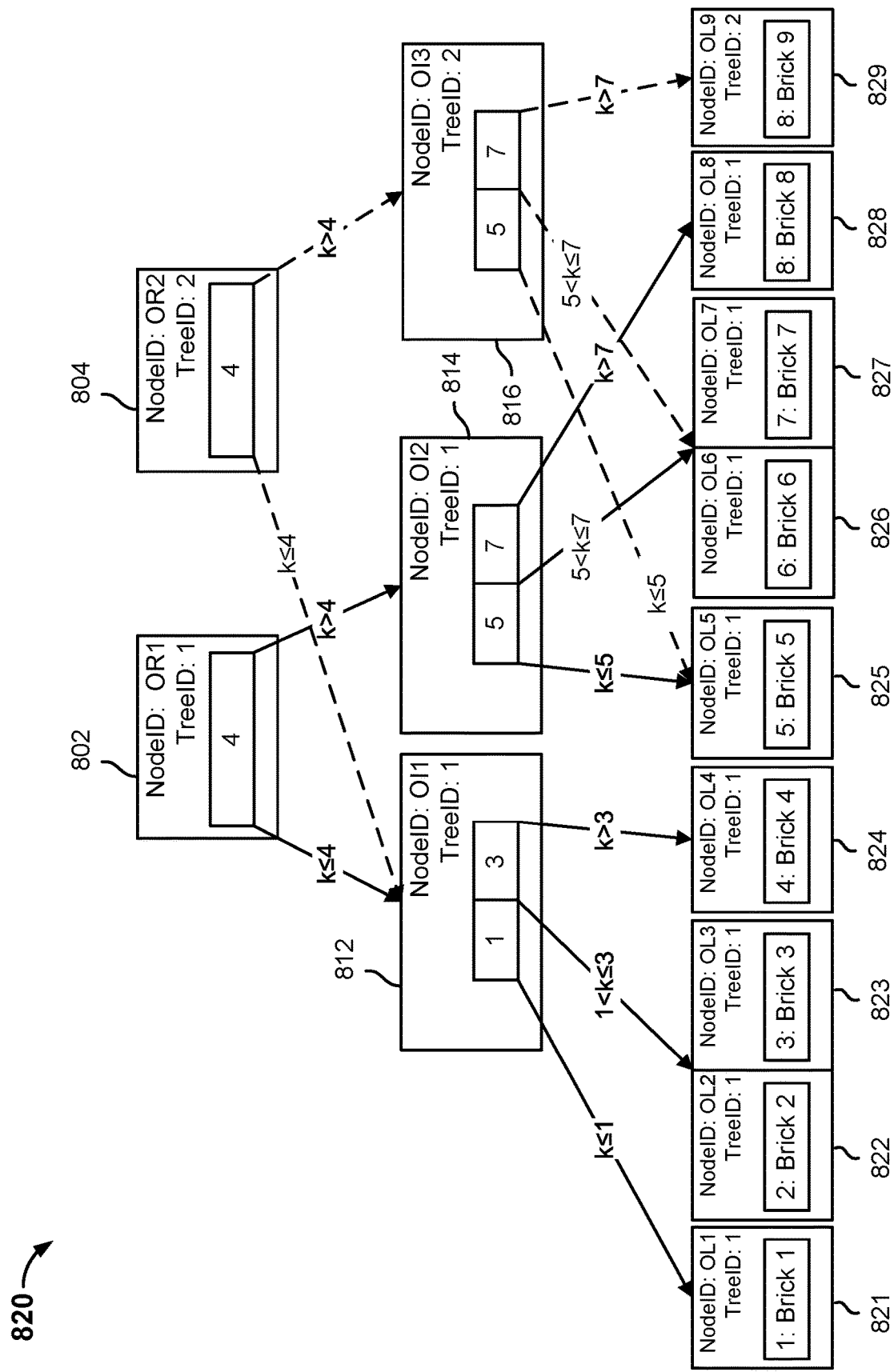
FIG. 8D is a block diagram illustrating an embodiment of a modified metadata structure.

FIG. 8D is a block diagram illustrating an embodiment of a modified metadata structure. The tree data structure 820 shown in FIG. 8D illustrates a result of the modifications made to tree data structure shown in FIG. 8C.

Figure 9A:
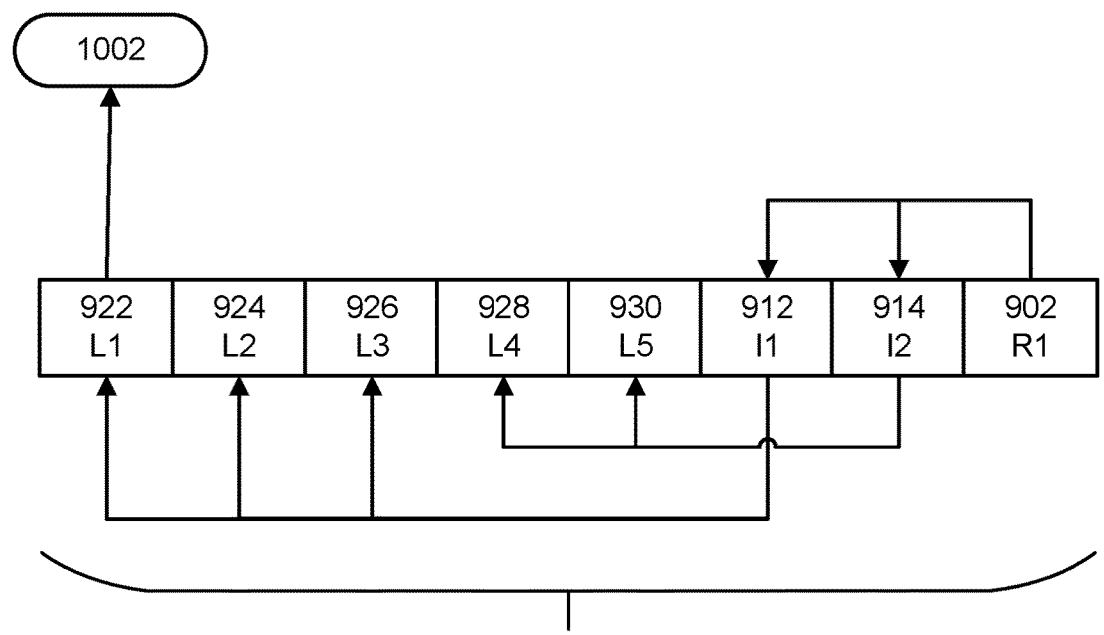
FIG. 9A is a block diagram illustrating a metadata object in accordance with some embodiments.

FIG. 9A is a block diagram illustrating a metadata object in accordance with some embodiments. Metadata object 900 may be generated by an archive manager, such as archive managers 118, 169. A snapshot may be stored locally at a source system, such as source system 103. A snapshot allows the state of a source system to be rolled back to a moment in time for which a snapshot is stored. A source system may store many snapshots (e.g., thousands, millions). Each snapshot may require a significant amount of storage (e.g., GBs, TBs, PBs, etc.). In some instances, it may be desirable to archive a snapshot to a remote storage, such as cloud storage 122. For example, one or more older snapshots may be archived to remote storage location for long-term retention, for data recovery purposes (e.g., other storage systems may access the data associated with a snapshot in the event a storage location that locally stores the snapshot goes offline), to handle spikes in storage demand, and/or to free up local storage for one or more snapshots that include hot data (i.e., data that is accessed frequently).

An archive policy may indicate that a full archive of a snapshot or an incremental archive of the snapshot is to be performed and archived to the remote storage. A full archive includes a complete view of a snapshot at a particular moment in time. An incremental archive provides a complete view of a source system at a particular moment in time, but includes data that was not included in a previous archived to the remove storage. The archive policy may indicate a frequency at which data associated with the source system is archived to remote storage.

As described above, a file system manager may initially generate a snapshot tree and metadata structure(s) to represent a view of a source system at a particular point in time. The file system manager may subsequently serialize the snapshot tree and the metadata structure(s) into corresponding metadata objects that are comprised of a flat set of data. The flat set of data includes a plurality of data blocks where each data block of the flat set of data corresponds to a node of the tree data structure. A data block that corresponds to a root node or intermediate node of the tree data structure includes a file offset to another data block of a flat set of data. A data block that corresponds to a leaf node of a snapshot tree includes a file offset to a data block corresponding to a root node of a metadata structure. A data block that corresponds to a leaf node of a metadata structure includes a reference to a storage location for one or more data chunks with which the leaf node is associated (e.g., a chunk object). A storage of a storage node or a cloud server (e.g., EC2 instance) that stores the metadata may be less reliable and/or more expensive the cloud storage (e.g., S3). The metadata for the one or more data chunks may be serialized and stored at cloud storage to ensure that the metadata for the one or more data chunks is not lost in the event the storage of a storage node or a cloud server fails.

A metadata object corresponding to a full archive includes a root node associated with the view at the particular moment in time (e.g., to), any intermediate nodes associated with the root node, and any leaf nodes associated with the root node. A metadata object corresponding to a full archive does not include a data block corresponding to a node of a previous version of a snapshot tree. An example of a metadata object associated with a full archive is depicted in FIG. 9A. The metadata object 900 includes a flat set of data 961. The flat set of data 961 corresponds to the tree data structure depicted in FIG. 7A.

Tree data structure 700 is an example of a snapshot tree and includes root node 702, intermediate nodes 712, 714, and leaf nodes 722, 724 726, 728, and 730. Metadata object 900 is a serialized version of tree data structure 700. Each data block of flat set of data 961 corresponds to a node of tree data structure 700. A data block may contain a file offset. A file offset represents of pointer of a snapshot tree. A file offset is used in place of pointers because some archive systems cannot store pointers. The file offset may be to another data block of the serialized snapshot tree data. The file offset may be to another data block of a different serialized snapshot tree data.

In the example shown, data blocks 922, 924, 926, 928, 930, 912, 914, and 902 of flat set of data 961 correspond to nodes 722, 724, 726, 728, 730, 712, 714, and 702 of tree data structure 700, respectively. Data block 922 includes a file offset to data block 1002, which corresponds to root node 802 of tree data structure 800.

Figure 9B:
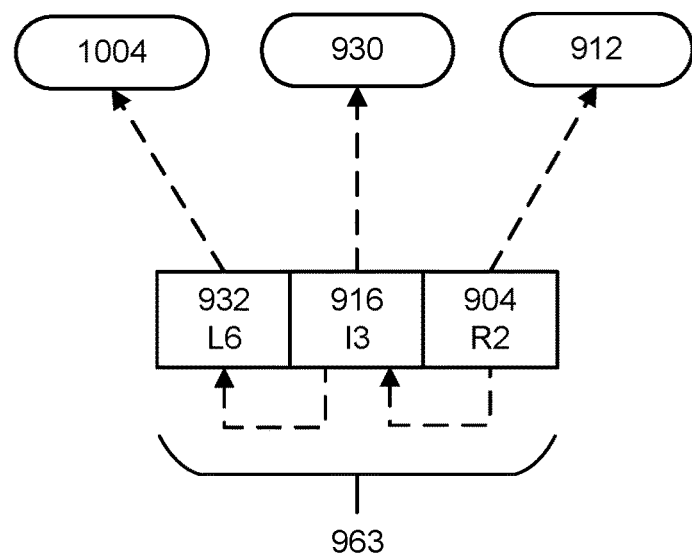
FIG. 9B is a block diagram illustrating a metadata object in accordance with some embodiments.

FIG. 9B is a block diagram illustrating a metadata object in accordance with some embodiments. Metadata object 950 may be generated by an archive manager, such as archive managers 118, 169.

A metadata object corresponding to an incremental archive includes a root node associated with the view at a particular moment in time (e.g., ti), any intermediate nodes associated with the root node, and any leaf nodes associated with the root node, and includes at least one data block that stores a file offset to another data block of a flat set of data associated with a different archive.

In the example shown, metadata object 950 is an example of a metadata object associated with an incremental archive and includes a flat set of data 963. The flat set of data 963 corresponds to the tree data structure depicted in FIG. 7D.

Tree data structure 775 is an example of two snapshot trees that are linked together. The snapshot tree with root node 702 corresponds to a state of a source system at a first point in time to and the snapshot tree with root node 704 corresponds to a state of the source system at the second point in time ti. Between to and ti, the value associated with data key 6 has changed from "DATA6" to "DATA6'". The snapshot tree with root node 704 includes root node 704, intermediate nodes 712, 716, and leaf nodes 722, 724, 726, 730, 732.

The flat set of data 963 includes data blocks 932, 916, 904. These data blocks correspond to nodes 732, 716, 704 of tree data structure 775. The flat set of data 963 does not include data blocks that correspond to nodes 712, 722, 724, 726, and 730 because data blocks corresponding to those nodes were already stored at the remote storage in the flat set of data 961. Instead of storing duplicate data blocks for theses nodes, the flat set of data 963 includes file offsets to data blocks included in the flat set of data 961. Data block 904 stores a file offset to data block 912 because root node 704 stores a pointer to intermediate node 712. Data block 916 stores a file offset to data block 930 because intermediate node 716 stores a pointer to leaf node 730. Data block 932 includes a file offset to block 1004, which corresponds to root node 804 of tree data structure 820.

Figure 10A:
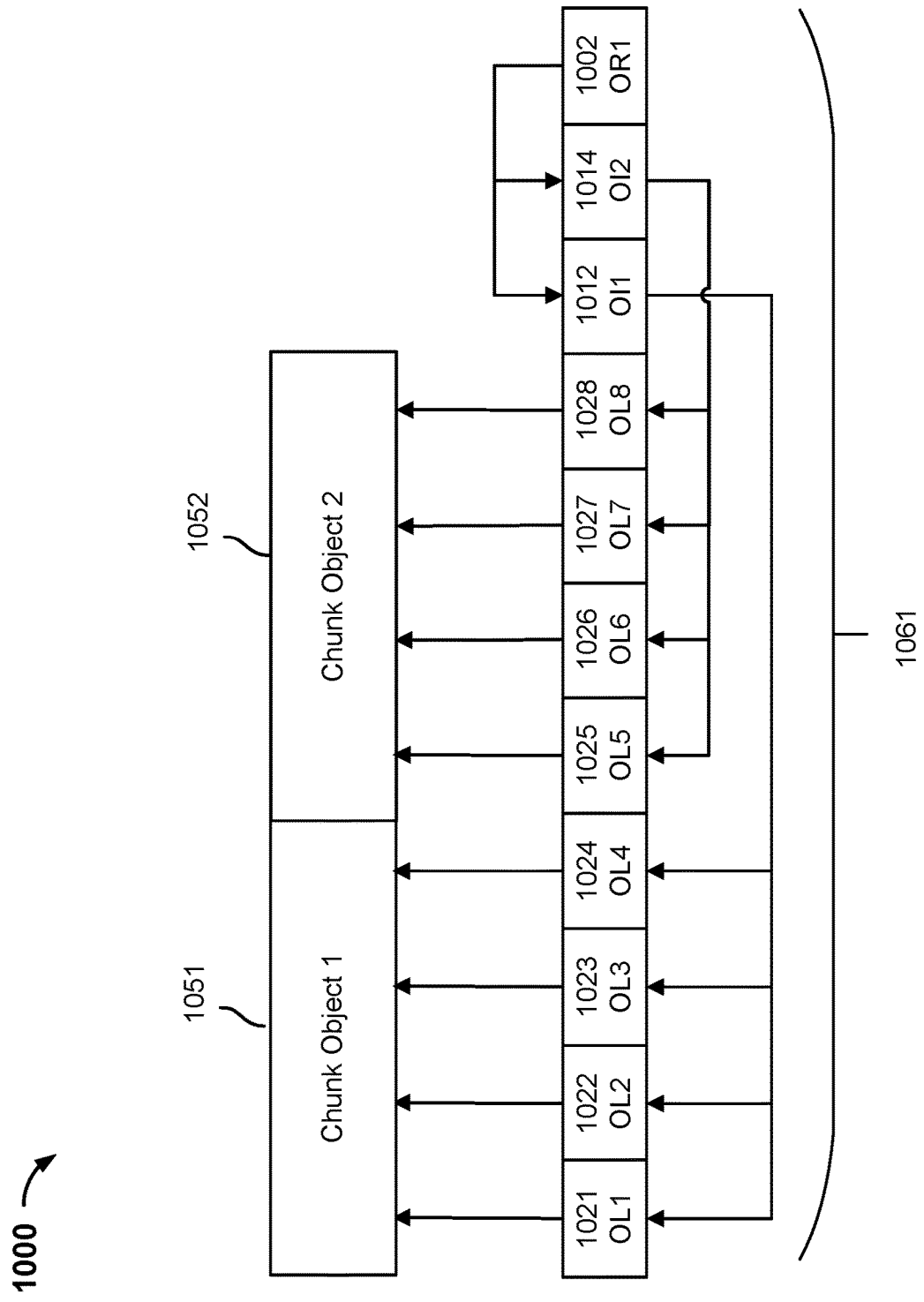
FIG. 10A is a block diagram illustrating a metadata object in accordance with some embodiments.

FIG. 10A is a block diagram illustrating a metadata object in accordance with some embodiments. Metadata object 1000 may be generated by an archive manager, such as archive managers 118, 169.

In the example shown, metadata object 1000 corresponds to a full archive of an object stored at a source system at a particular point in time to. The flat set of data 1061 corresponds to the tree data structure depicted in FIG. 8A.

Metadata structure 800 provides a view of the object stored at the source system at to. Metadata object includes root node 802, intermediate nodes 812, 814, and leaf nodes 821, 822, 823, 824, 825, 826, 827, 828. Each of the leaf nodes store corresponding data brick identifiers.

Metadata object 1000 is a serialized version of metadata structure 800. Each block of the flat set of data 1061 corresponds to a node of tree data structure 800. Data blocks 1021, 1022, 1023, 1024, 1025, 1026, 1027, 1028, 1012, 1014, and 1002 correspond to nodes 821, 822, 823, 824, 825, 826, 827, 828, 812, 814, and 802, respectively. Data blocks 1021, 1022, 1023, 1024 store corresponding chunk offsets of data chunks stored in chunk object 1051. Data blocks 1025, 1026, 1027, 1028 store corresponding chunk object offsets for data chunks in chunk object 1052.

Figure 10B:
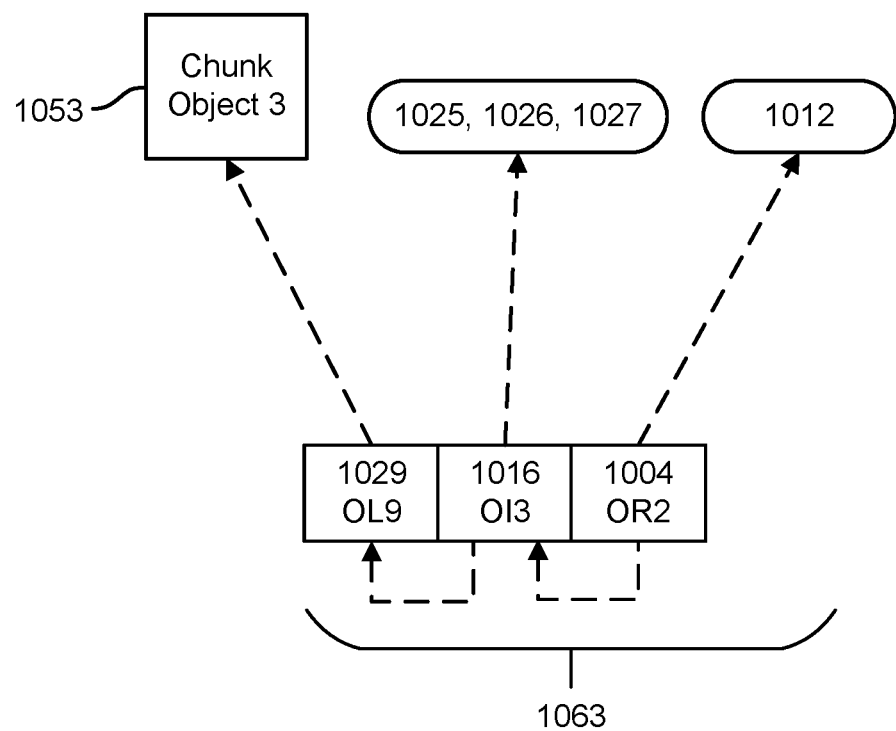
FIG. 10B is a block diagram illustrating a metadata object in accordance with some embodiments.

FIG. 10B is a block diagram illustrating a metadata object in accordance with some embodiments. Metadata object 1050 may be generated by an archive manager, such as archive managers 118, 169.

In the example shown, metadata object 1050 corresponds to an incremental of an object stored at a source system at a particular point in time ti. The flat set of data 1063 corresponds to the tree data structure depicted in FIG. 8D.

Tree data structure 820 is an example of two metadata structures that are linked together. The metadata structure with root node 802 corresponds to a state of an object stored at a source system at a first point in time to and the metadata structure with root node 804 corresponds to a state of an object stored at the source system at the second point in time ti. Between to and ti, the value associated with data key 8 has changed from "Brick 8" to "Brick 9". The metadata structure with root node 804 includes root node 804, intermediate nodes 812, 816, and leaf nodes 821, 822, 823, 824, 825, 826, 827, 829.

The flat set of data 1063 includes data blocks 1029, 1016, 1004. These data blocks correspond to nodes 829, 816, 804 of tree data structure 820. The flat set of data 1063 does not include data blocks that correspond to nodes 812, 821, 822, 823, 824, 825, 826, and 827 because data blocks corresponding to those nodes were already stored at the remote storage in the flat set of data 1061. Instead of storing duplicate data blocks for theses nodes, the flat set of data 1063 includes file offsets to data blocks included in the flat set of data 1061. Data block 1004 stores a file offset to data block 1012 because root node 804 stores a pointer to intermediate node 812. Data block 1016 stores file offsets to data blocks 1025, 1026, and 1027 because intermediate node 816 stores pointers to leaf node 825, 826, and 827. Block 1029 includes a chunk offset for a data chunk stored in chunk object 1053.

Figure 11:
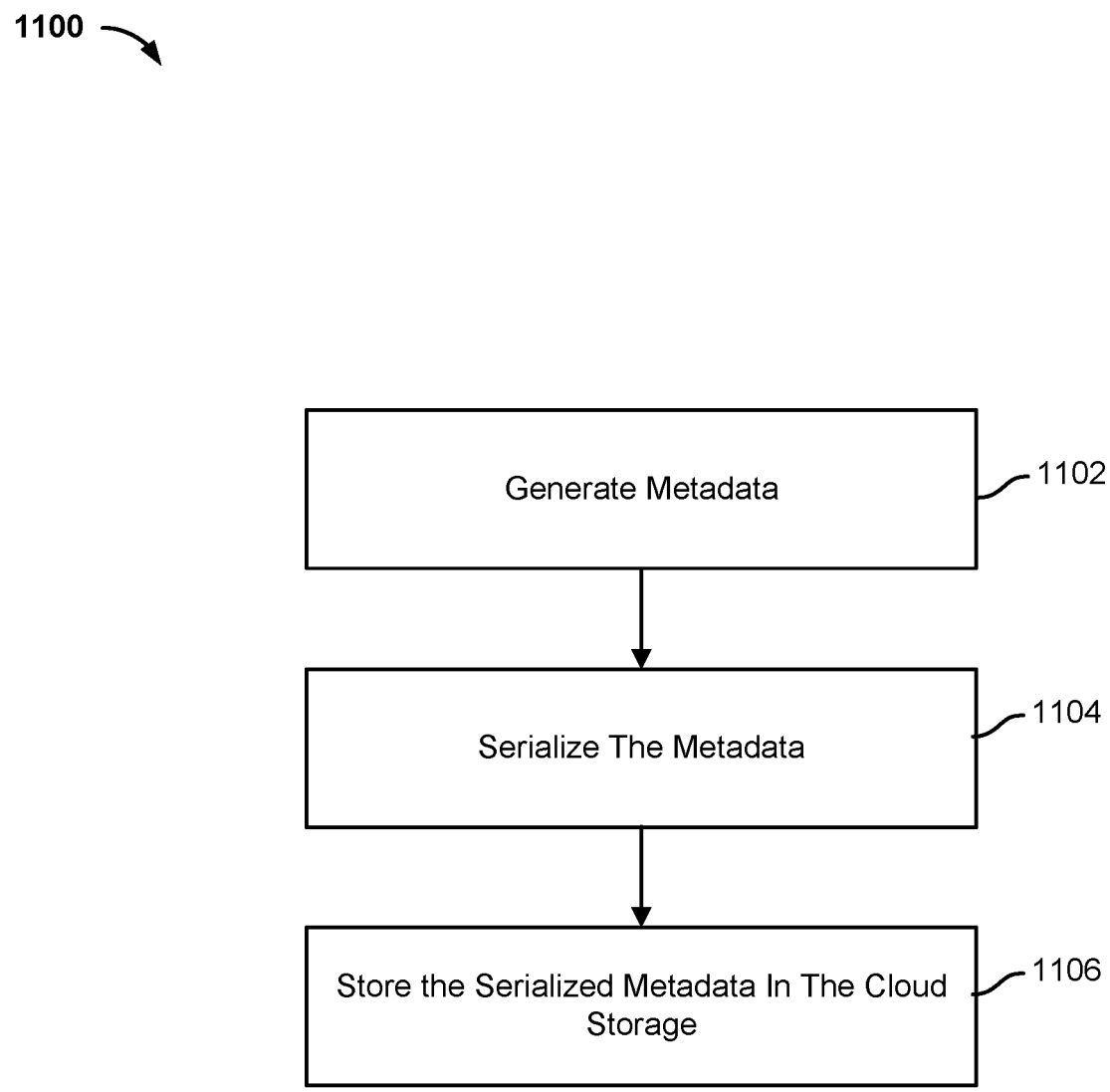
FIG. 11 is a flow diagram illustrating a process for generating metadata objects in accordance with some embodiments.

FIG. 11 is a flow diagram illustrating a process for generating metadata objects in accordance with some embodiments. In the example shown, process 1100 may be implemented by a cloud server, such as one of the one or more cloud servers 113. In some embodiments, process 1100 may be implemented by a storage system, such as storage system 105.

At 1102, metadata is generated for data that is to be archived to a remote storage. A file system manager is configured to generate metadata (e.g., tree data structures, chunk metadata data structure, chunk object metadata data structure, archive metadata) that enables the one or more data chunks that were written to cloud storage to be located and provides a view (partial or complete) of the source system at a particular moment in time.

At 1104, the generated metadata is serialized into a data file comprising a flat set of data. The flat set of data includes a plurality of data blocks where each data block of the flat set of data corresponds to a node of the tree data structure.

At 1106, the serialized metadata is stored in the cloud storage. The generated metadata for the one or more data chunks may be serialized and stored at cloud storage to ensure that the metadata for the one or more data chunks is not lost in the event the storage of a storage node or a cloud server fails.

Steps 1104 and 1106 may be periodically (e.g., daily, weekly, bi-monthly, monthly, etc.) performed. In some embodiments, steps 1104 and 1106 are performed after a particular amount of time has passed after an archive has completed.

Figure 12:
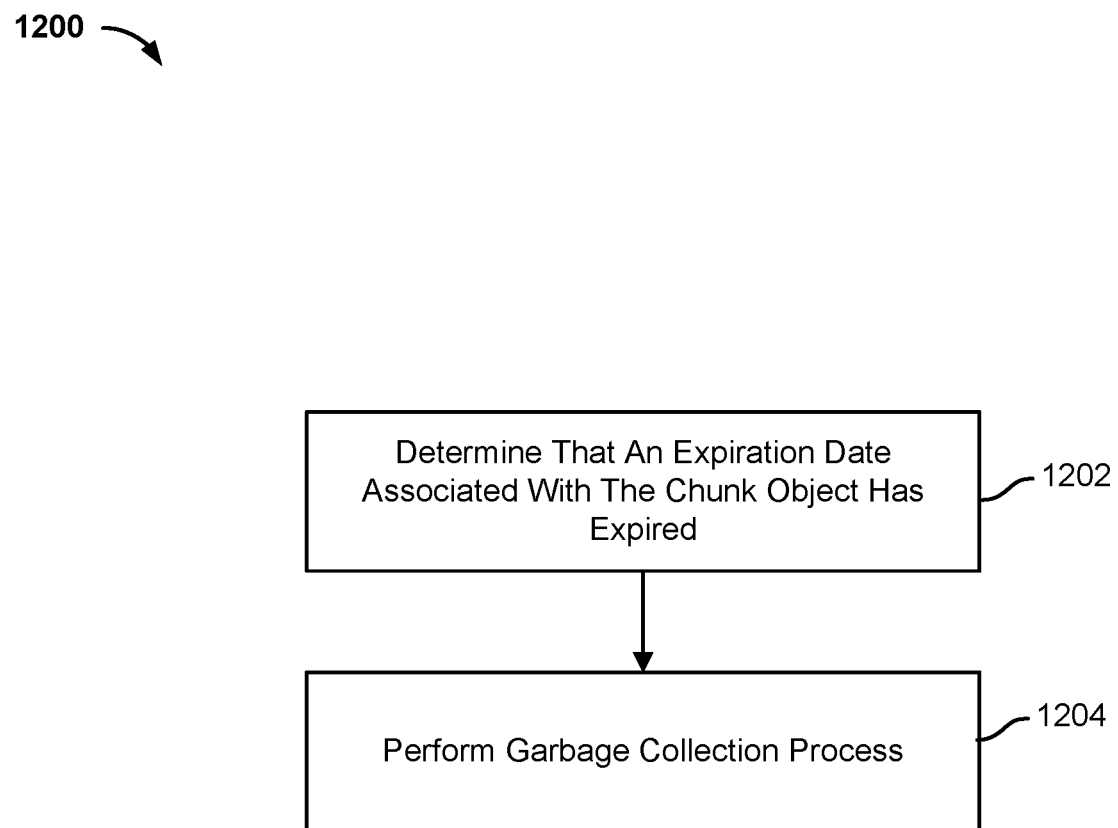
FIG. 12 is a flow diagram illustrating a process for performing garbage collection in accordance with some embodiments.

FIG. 12 is a flow diagram illustrating a process for performing garbage collection in accordance with some embodiments. In some embodiments, process 1200 is implemented by an archive manager, such as archive managers 118, 169.

At 1202, it is determined that an expiration date associated with a chunk object has expired. In some embodiments, the expiration date for the chunk object is an expiration date for an archive that includes the chunk object. In some embodiments, the expiration date associated with the chunk object is an expiration date for an object associated with an archive that includes the chunk object.

A garbage collection process may read the plurality of archive metadata objects stored in cloud storage. Each of the archive metadata objects is associated with a corresponding expiration date. In the event an expiration date associated with an archive has expired, the objects associated with the archive (e.g., chunk object(s), metadata object(s), archive metadata object) are subject to garbage collection.

At 1204, a garbage collection process is performed. The garbage collection process may be periodically performed (e.g., every four hours). The garbage collection process may be comprised of two sub-processes. The first sub-process is configured to delete unreferenced data chunks from a chunk object. The second sub-process is configured to delete references to data chunks from metadata objects.

The first sub-process may be performed by scanning the plurality of metadata objects and reading the data blocks that correspond to leaf nodes of a metadata structure. Some of the data blocks of the metadata objects reference data chunks included in a chunk object. The garbage collection process is configured to count the number of data chunks in included in a chunk object that are referenced.

The total number of data chunks stored in a chunk object is stored in a chunk object metadata data structure. The chunk object metadata data structure indicates the number of data chunks that are stored in each chunk object, when each chunk object was created, and/or when each chunk object was modified, if at all. The chunk object metadata data structure may be stored by a storage system or a cloud server.

In some embodiments, in the event a number of referenced data chunks is less than a threshold number of data chunks, then the unreferenced data chunks are deleted from the chunk object. In the event the number of referenced data chunks is not less than the threshold number of data chunks, then the unreferenced data chunks are not deleted from the chunk object.

In some embodiments, in the event a percentage of referenced data chunks is less than a threshold percentage, then the unreferenced data chunks are deleted from the chunk object. In the event the percentage of referenced data chunks is not less than the threshold percentage, then the unreferenced data chunks are not deleted from the chunk object.

The second sub-process may be performed by deleting the one or more data blocks from a metadata object that are exclusively referenced by an expired archive. This causes one or more data chunks referenced by the one or more deleted data blocks to become unreferenced.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving an indication to store to a remote storage a new archive of a snapshot of a source storage;
   determining that at least one shared data chunk of the new archive is already stored in an existing chunk object of the remote storage storing data chunks of a previous archive;
   determining one or more evaluation metrics for the existing chunk object based at least in part on a retention period associated with one or more individual chunks stored in the existing chunk object and a data lock period associated with an entire portion of the existing chunk object, wherein the one or more evaluation metrics for the existing chunk object are based at least in part on a percentage of data chunks of the existing chunk object that have expired and an amount of time before the existing chunk object is allowed to be removed from the remote storage; and
   determining based on the one or more evaluation metrics whether to reference the at least one shared data chunk of the new archive from the existing chunk object or store the at least one shared data chunk in a new chunk object of the remote storage.

2. The method of claim 1, wherein determining that the at least one shared data chunk of the new archive that is already stored in the existing chunk object of the remote storage storing data chunks of a previous archive includes comparing a corresponding chunk identifier associated with the at least one shared data chunk of the new archive with a plurality of chunk identifiers stored in an archive chunk metadata data structure.

3. The method of claim 2, wherein the archive chunk metadata data structure includes a plurality of entries, wherein each entry of the plurality of entries associates a chunk identifier corresponding to a data chunk with a chunk object identifier associated with a chunk object storing the data chunk.

4. A method, comprising:
   receiving an indication to store to a remote storage a new archive of a snapshot of a source storage;
   determining that at least one shared data chunk of the new archive is already stored in an existing chunk object of the remote storage storing data chunks of a previous archive;
   determining one or more evaluation metrics for the existing chunk object based at least in part on a retention period associated with one or more individual chunks stored in the existing chunk object and a data lock period associated with an entire portion of the existing chunk object, wherein the one or more evaluation metrics for the existing chunk object include a percentage of data chunks of the existing chunk object that have expired; and
   determining based on the one or more evaluation metrics whether to reference the at least one shared data chunk of the new archive from the existing chunk object or store the at least one shared data chunk in a new chunk object of the remote storage, wherein determining based on the one or more evaluation metrics whether to reference the at least one shared data chunk of the new archive from the existing chunk object or store the at least one shared data chunk in the new chunk object of the remote storage includes comparing the percentage of data chunks of the existing chunk object that have expired to an expiration threshold percentage.

5. The method of claim 4, further comprising referencing the at least one shared data chunk from the existing chunk object in response to determining that the percentage of data chunks of the existing chunk object that have expired is not greater than the expiration threshold percentage.

6. The method of claim 4, further comprising storing the at least one shared data chunk in the new chunk object of the remote storage in response to determining that the percentage of data chunks of the existing chunk object that have expired is greater than the expiration threshold percentage.

7. A method, comprising:
   receiving an indication to store to a remote storage a new archive of a snapshot of a source storage;
   determining that at least one shared data chunk of the new archive is already stored in an existing chunk object of the remote storage storing data chunks of a previous archive;
   determining one or more evaluation metrics for the existing chunk object based at least in part on a retention period associated with one or more individual chunks stored in the existing chunk object and a data lock period associated with an entire portion of the existing chunk object, wherein the one or more evaluation metrics for the existing chunk object include an amount of time before the existing chunk object is allowed to be removed from the remote storage; and determining based on the one or more evaluation metrics whether to reference the at least one shared data chunk of the new archive from the existing chunk object or store the at least one shared data chunk in a new chunk object of the remote storage, wherein determining based on the one or more evaluation metrics whether to reference the at least one shared data chunk of the new archive from the existing chunk object or store the at least one shared data chunk in the new chunk object of the remote storage includes comparing the amount of time before the existing chunk object can be removed from the remote storage to an expiration threshold period.

8. The method of claim 7, wherein the amount of time is based on the retention period associated with one or more individual chunks stored in the existing chunk object and the data lock period associated with the entire portion of the existing chunk object.

9. The method of claim 7, further comprising referencing the at least one shared data chunk from the existing chunk object in response to determining that the amount of time before the existing chunk object can be removed from the remote storage is not within the expiration threshold period.

10. The method of claim 7, further comprising storing the at least one shared data chunk in the new chunk object of the remote storage in response to determining that the amount of time before the existing chunk object can be removed from the remote storage is within the expiration threshold period.

11. The method of claim 1, wherein determining based on the one or more evaluation metrics whether to reference the at least one shared data chunk of the new archive from the existing chunk object or store the at least one shared data chunk in the new chunk object of the remote storage includes comparing the percentage of data chunks of the existing chunk object that have expired to an expiration threshold percentage and comparing the amount of time before the existing chunk object can be removed from the remote storage to an expiration threshold period.

12. The method of claim 11, further comprising referencing the at least one shared data chunk from the existing chunk object in response to determining that the percentage of data chunks of the existing chunk object that have expired is not greater than the expiration threshold percentage and/or the amount of time before the existing chunk object can be removed from the remote storage is not within the expiration threshold period.

13. The method of claim 11, further comprising storing the at least one shared data chunk in the new chunk object of the remote storage in response to determining that that the percentage of data chunks of the existing chunk object that have expired is greater than the expiration threshold percentage and the amount of time before the existing chunk object can be removed from the remote storage is within the expiration threshold period.

14. The method of claim 1, wherein in response determining to reference the at least one shared data chunk of the new archive from the existing chunk object includes generating archive metadata for the new archive that references the at least one shared data chunk.

15. A non-transitory computer readable medium and comprising computer instructions for:

receiving an indication to store to a remote storage a new archive of a snapshot of a source storage;

determining that at least one shared data chunk of the new archive is already stored in an existing chunk object of the remote storage storing data chunks of a previous archive;

determining one or more evaluation metrics for the existing chunk object based at least in part on a retention period associated with one or more individual chunks stored in the existing chunk object and a data lock period associated with an entire portion of the existing chunk object, wherein the one or more evaluation metrics for the existing chunk object are based at least in part on a percentage of data chunks of the existing chunk object that have expired and an amount of time before the existing chunk object is allowed to be removed from the remote storage; and determining based on the one or more evaluation metrics whether to reference the at least one shared data chunk of the new archive from the existing chunk object or store the at least one shared data chunk in a new chunk object of the remote storage.

16. A system, comprising:
one or more processors configured to:
receive an indication to store to a remote storage a new archive of a snapshot of a source storage;

determine that at least one shared data chunk of the new archive is already stored in an existing chunk object of the remote storage storing data chunks of a previous archive;

determine one or more evaluation metrics for the existing chunk object based at least in part on a retention period associated with one or more individual chunks stored in the existing chunk object and a data lock period associated with an entire portion of the existing chunk object, wherein the one or more evaluation metrics for the existing chunk object are based at least in part on a percentage of data chunks of the existing chunk object that have expired and an amount of time before the existing chunk object is allowed to be removed from the remote storage; and determine based on the one or more evaluation metrics whether to reference the at least one shared data chunk of the new archive from the existing chunk object or store the at least one shared data chunk in a new chunk object of the remote storage; and a memory coupled to the one or more processors and configured to provide the one or more processors with instructions.

17. The non-transitory computer readable medium of claim 15, wherein determining that the at least one shared data chunk of the new archive that is already stored in the existing chunk object of the remote storage storing data chunks of a previous archive includes comparing a corresponding chunk identifier associated with the at least one shared data chunk of the new archive with a plurality of chunk identifiers stored in an archive chunk metadata data structure.

18. The non-transitory computer readable medium of claim 17, wherein the archive chunk metadata data structure includes a plurality of entries, wherein each entry of the plurality of entries associates a chunk identifier corresponding to a data chunk with a chunk object identifier associated with a chunk object storing the data chunk.

19. The non-transitory computer readable medium of claim 15, wherein in response determining to reference the at least one shared data chunk of the new archive from the existing chunk object includes generating archive metadata for the new archive that references the at least one shared data chunk.

20. The system of claim 16, wherein to determine that the at least one shared data chunk of the new archive that is already stored in the existing chunk object of the remote storage storing data chunks of a previous archive, the one or more processors are configured to compare a corresponding chunk identifier associated with the at least one shared data chunk of the new archive with a plurality of chunk identifiers stored in an archive chunk metadata data structure.

* * * * *